(12) United States Patent
Iwanaga et al.

(10) Patent No.: US 9,896,579 B2
(45) Date of Patent: Feb. 20, 2018

(54) THERMOPLASTIC RESIN COMPOSITION AND MOLDED ARTICLE THEREOF

(71) Applicant: UMG ABS, LTD., Chuo-ku (JP)

(72) Inventors: Takashi Iwanaga, Ube (JP); Kousaku Tao, Ube (JP); Nobutaka Hase, Ube (JP)

(73) Assignee: UMG ABS, LTD., Chuo-ku (JP)

( * ) Notice: Subject to any disclaimer, the term of this patent is extended or adjusted under 35 U.S.C. 154(b) by 0 days.

(21) Appl. No.: 15/322,304

(22) PCT Filed: Jul. 6, 2015

(86) PCT No.: PCT/JP2015/069402
§ 371 (c)(1),
(2) Date: Dec. 27, 2016

(87) PCT Pub. No.: WO2016/006567
PCT Pub. Date: Jan. 14, 2016

(65) Prior Publication Data
US 2017/0137620 A1    May 18, 2017

(30) Foreign Application Priority Data

Jul. 8, 2014 (JP) ................ 2014-140635

(51) Int. Cl.
C08L 33/12 (2006.01)
C08L 51/04 (2006.01)
C08L 51/06 (2006.01)
C08F 291/02 (2006.01)

(52) U.S. Cl.
CPC ............ *C08L 33/12* (2013.01); *C08F 291/02* (2013.01); *C08L 2201/08* (2013.01); *C08L 2205/03* (2013.01); *C08L 2207/04* (2013.01)

(58) Field of Classification Search
CPC ..... C08L 33/12; C08L 2205/03; C08L 291/02
See application file for complete search history.

(56) References Cited

U.S. PATENT DOCUMENTS 5,045,595 A    9/1991  Wang

FOREIGN PATENT DOCUMENTS

| EP | 0 370 344 A2 | 5/1990 |
|----|----|----|
| EP | 1 445 281 A1 | 8/2004 |
| JP | 2-199109 A | 8/1990 |
| JP | 4-63854 A | 2/1992 |
| JP | 8-199025 A | 8/1996 |
| JP | 8-283524 A | 10/1996 |
| JP | 2001-158845 A | 6/2001 |
| JP | 2003-277567 A | 10/2003 |
| JP | 2003-292715 A | 10/2003 |
| JP | 2004-346187 A | 12/2004 |
| JP | 2004-352842 A | 12/2004 |
| JP | 2005-132970 A | 5/2005 |
| WO | WO 2010/032854 A1 | 3/2010 |

OTHER PUBLICATIONS

Office Action dated Feb. 14, 2017 in Japanese Patent Application No. 2015-535916 (with English language translation).
International Search Report dated Aug. 25, 2015 in PCT/JP2015/069402 filed Jul. 6, 2015.
Extended European Search Report dated Dec. 15, 2017 in European Patent Application No. 15819767.3, filed Jul. 6, 2015.

*Primary Examiner* — Jeffrey Mullis
(74) *Attorney, Agent, or Firm* — Oblon, McClelland, Maier & Neustadt, L.L.P.

(57) ABSTRACT

A thermoplastic resin composition of the present invention contains a graft copolymer (B) obtained by polymerizing a vinyl-based monomer component (m1) in the presence of a composite rubber polymer (A) formed from a polyorganosiloxane (Aa) and a poly(meth)acrylate ester (Ab), and a (meth)acrylate ester resin (C) obtained by polymerizing a vinyl-based monomer component (m2), wherein the amount of the polyorganosiloxane (Aa) relative to the total mass (100% by mass) of the composite rubber polymer (A) is from 1 to 20% by mass, the volume average particle size of the composite rubber polymer (A) is from 0.05 to 0.15 μm, and relative to the total mass (100% by mass) of the vinyl-based monomer component (m2), the amount of the maleimide-based compound is from 1 to 30% by mass, and the amount of the aromatic vinyl compound is from 5.5 to 15% by mass.

11 Claims, 1 Drawing Sheet

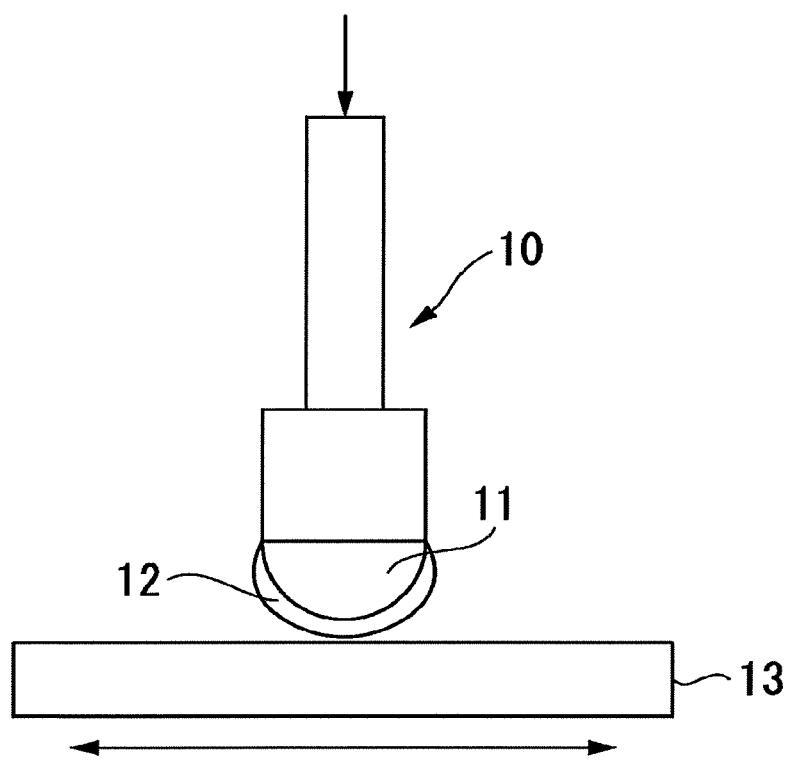

THERMOPLASTIC RESIN COMPOSITION AND MOLDED ARTICLE THEREOF

TECHNICAL FIELD

The present invention relates to a thermoplastic resin composition and a molded article thereof.

Priority is claimed on Japanese Patent Application No. 2014-140635, filed Jul. 8, 2014, the content of which is incorporated herein by reference.

BACKGROUND ART

Improving the impact resistance of molded articles enhances the industrial applicability of such molded articles significantly, not only by expanding the number of potential applications, but also by enabling the molded articles to be made with thinner walls or in larger sizes. As a result, numerous techniques have already been proposed for improving the impact resistance of molded articles.

Among these techniques, one technique which uses a resin material containing a combination of a rubber-like polymer and a hard resin to enhance the impact resistance of the molded article while retaining the inherent properties derived from the hard resin is already being used in industrial settings. Examples of this type of resin material include acrylonitrile-butadiene-styrene (ABS) resins, acrylonitrile-ethylene/α-olefin-styrene (AES) resins, polyorganosiloxane-acrylate-acrylonitrile-styrene (SAS) resins, acrylonitrile-styrene-acrylate (ASA) resins, and thermoplastic resin compositions prepared by adding one of these resin materials to a hard resin.

Examples of thermoplastic resin compositions that have been proposed which are capable of forming a molded article having improved impact resistance while retaining the properties derived from the hard resin include the following thermoplastic resin compositions.

(1) A thermoplastic resin composition obtained by adding an SAS resin to a methacrylate ester hard resin (Patent Document 1).

(2) A thermoplastic resin composition obtained by adding an SAS resin to a maleimide-based copolymer hard resin (Patent Document 2).

(3) A thermoplastic resin composition obtained by adding an AES resin to a methacrylate ester hard resin (Patent Document 3).

(4) A thermoplastic resin composition obtained by adding an AES resin to a maleimide-based copolymer hard resin (Patent Document 4).

(5) A thermoplastic resin composition obtained by adding an AES resin and an ASA resin to a methacrylate ester hard resin (Patent Document 5).

However, in the thermoplastic resin composition of (1), a large amount of the SAS resin must be added to improve the impact resistance of the molded article, and therefore in the resulting molded article, the surface hardness (scratch resistance), heat resistance and heat aging resistance derived from the methacrylate ester resin deteriorate markedly.

In the thermoplastic resin composition of (2), because a maleimide-acrylonitrile-styrene copolymer is used as the hard resin, the weather resistance and heat aging resistance of the molded article deteriorate markedly.

In the thermoplastic resin composition of (3), a large amount of the AES resin must be added to improve the impact resistance of the molded article, and therefore in the resulting molded article, the surface hardness (scratch resistance) derived from the methacrylate ester resin tends to deteriorate markedly. Further, if an attempt is made to improve the heat resistance of the this type of molded article, then the balance of properties deteriorates further and satisfactory performance cannot be maintained.

In the thermoplastic resin composition of (4), a large amount of an AES resin having a comparatively large particle size must be added to improve the impact resistance of the molded article, and therefore the coloration of the molded article tends to deteriorate.

In the thermoplastic resin composition of (5), an AES resin and an ASA resin are added to suppress any deterioration in the coloration of the molded article, but the impact resistance of the molded article is inferior to that obtained by adding only an AES resin.

PRIOR ART LITERATURE

Patent Documents

Patent Document 1: Japanese Unexamined Patent Application, First Publication No. Hei 08-283524
Patent Document 2: Japanese Unexamined Patent Application, First Publication No. Hei 08-199025
Patent Document 3: Japanese Unexamined Patent Application, First Publication No. 2005-132970
Patent Document 4: Japanese Unexamined Patent Application, First Publication No. 2004-352842
Patent Document 5: Japanese Unexamined Patent Application, First Publication No. 2004-346187

DISCLOSURE OF INVENTION

Problems to be Solved by the Invention

The present invention provides a thermoplastic resin composition of favorable fluidity which forms a molded article having excellent scratch resistance, impact resistance, coloration, heat resistance, weather resistance or heat aging resistance, and also provides a molded article having excellent scratch resistance, impact resistance, coloration, heat resistance, weather resistance or heat aging resistance.

Means for Solving the Problems

The present invention includes the aspects described below.

<1> A thermoplastic resin composition containing:
a graft copolymer (B) obtained by polymerizing a vinyl-based monomer component (m1) containing an aromatic vinyl compound and a vinyl cyanide compound in the presence of a composite rubber polymer (A) formed from a polyorganosiloxane (Aa), and a poly(meth)acrylate ester (Ab) having units derived from a (meth)acrylate ester and either one of, or both, units derived from a crosslinking agent and units derived from a graft-linking agent, and
a (meth)acrylate ester resin (C) obtained by polymerizing a vinyl-based monomer component (m2) containing a (meth)acrylate ester, a maleimide-based compound and an aromatic vinyl compound, wherein
an amount of the polyorganosiloxane (Aa) relative to the total mass (100% by mass) of the composite rubber polymer (A) is from 1 to 20% by mass,
the volume average particle size of the composite rubber polymer (A) is from 0.05 to 0.15 μm, and
relative to the total mass (100% by mass) of the vinyl-based monomer component (m2), an amount of the maleimide-based compound is from 1 to 30% by mass, and an amount of the aromatic vinyl compound is from 5.5 to 15% by mass.

<2> The thermoplastic resin composition disclosed in <1>, wherein the polyorganosiloxane (Aa) is a polyorganosiloxane having a vinyl polymerizable functional group.

<3> The thermoplastic resin composition disclosed in <1> or <2>, wherein the polyorganosiloxane (Aa) contains 0.3 to 3 mol % of siloxane units containing a vinyl polymerizable functional group and 97 to 99.7 mol % of dimethylsiloxane units relative to the total number of moles of all the structural units, and the number of silicon atoms having 3 or more siloxane linkages is not more than 1 mol % relative to the total number of moles of all the silicon atoms.

<4> The thermoplastic resin composition disclosed in any one of <1> to <3>, wherein relative to the total mass of the vinyl-based monomer component (m1), an amount of the aromatic vinyl compound is from 65 to 82% by mass, and an amount of the vinyl cyanide compound is from 18 to 35% by mass.

<5> The thermoplastic resin composition disclosed in any one of <1> to <4>, wherein the graft copolymer (B) is obtained by polymerizing 10 to 80% by mass of the vinyl-based monomer component (m1) in the presence of 20 to 90% by mass of the composite rubber polymer (A) (provided that the combination of the composite rubber polymer (A) and the vinyl-based monomer component (m1) totals 100% by mass).

<6> The thermoplastic resin composition disclosed in any one of <1> to <5>, wherein relative to the total mass of the graft copolymer (B) and the (meth)acrylate ester resin (C), an amount of the graft copolymer (B) is from 18 to 80% by mass, and an amount of the (meth)acrylate ester resin (C) is from 20 to 82% by mass.

<7> The thermoplastic resin composition disclosed in any one of <1> to <6>, further containing a silicone oil (D).

<8> The thermoplastic resin composition disclosed in <7>, wherein an amount of the silicone oil (D) is from 0.1 to 5 parts by mass per 100 parts by mass of the combination of the graft copolymer (B) and the (meth)acrylate ester resin (C).

<9> The thermoplastic resin composition disclosed in any one of <1> to <8>, further containing a styrene-based resin (E) obtained by polymerizing a vinyl-based monomer component (m3) containing an aromatic vinyl compound and a vinyl cyanide compound.

<10> The thermoplastic resin composition disclosed in <9>, wherein relative to the total mass of the graft copolymer (B), the (meth)acrylate ester resin (C) and the styrene-based resin (E), an amount of the graft copolymer (B) is from 18 to 60% by mass, an amount of the (meth)acrylate ester resin (C) is from 20 to 81% by mass, and an amount of the styrene-based resin (E) is from 1 to 40% by mass.

<11> The thermoplastic resin composition disclosed in any one of <1> to <10>, further containing a graft copolymer (I) obtained by polymerizing a vinyl-based monomer component (m4) in the presence of an olefin-based copolymer.

<12> The thermoplastic resin composition disclosed in <11>, wherein relative to the total mass of the graft copolymer (B), the (meth)acrylate ester resin (C) and the graft copolymer (I), an amount of the graft copolymer (B) is from 18 to 60% by mass, an amount of the (meth)acrylate ester resin (C) is from 30 to 81% by mass, and an amount of the graft copolymer (I) is from 1 to 10% by mass.

<13> The thermoplastic resin composition disclosed in any one of <1> to <12>, wherein the Charpy impact strength of a molded article (Ma1) formed from the thermoplastic resin composition is at least 5 kJ/m$^2$.

<14> The thermoplastic resin composition disclosed in any one of <1> to <13>, wherein the absolute value of the difference in lightness $\Delta L^*$(mc−ma) of a molded article (Ma2) formed from the thermoplastic resin composition before and after an abrasion resistance test is less than 3.0.

<15> A molded article formed using the thermoplastic resin composition disclosed in any one of <1> to <14>.

Effects of the Invention

The thermoplastic resin composition of the present invention has favorable fluidity. Further, by using the thermoplastic resin composition of the present invention, a molded article having excellent scratch resistance, impact resistance, coloration, heat resistance, weather resistance or heat aging resistance can be obtained.

A molded article of the present invention exhibits excellent scratch resistance, impact resistance, coloration, heat resistance, weather resistance or heat aging resistance.

BRIEF DESCRIPTION OF THE DRAWINGS

The FIGURE shows a schematic diagram describing an abrasion resistance test using tissue abrasion.

BEST MODE FOR CARRYING OUT THE INVENTION

The following definitions of terms apply throughout the present description and the claims.

"(Meth)acrylate" means acrylate or methacrylate.

"Molded article" means an article produced by molding a thermoplastic resin composition.

"Scratch resistance" is a generic term encompassing scratching resistance, abrasion resistance, and the persistence of that abrasion resistance. "Scratching resistance" means resistance to scratches (scrapes) that occur when the surface of the molded article is scratched with a hard and sharp object such as a fingernail. "Abrasion resistance" means resistance to scratches (abrasion marks) that occur when the surface of the molded article is rubbed with a soft object such as a glove, gauze, cloth or tissue. "Abrasion resistance persistence" means minimal change in the abrasion resistance after leaving the molded article to stand under high-temperature conditions and then washing the surface of the molded article using a neutral surfactant.

"Heat aging resistance" means resistance to color change when the molded article is left to stand under high-temperature conditions (namely, minimal color difference after standing).

"Thermoplastic Resin Composition"

The thermoplastic resin composition of the present invention contains a graft copolymer (B) and a (meth)acrylate ester resin (C). If required, the thermoplastic resin composition of the present invention may also contain a silicone oil (D), a styrene-based resin (E), a graft copolymer (I), other thermoplastic resins and various additives, provided these other components do not impair the effects of the present invention.

The graft copolymer (B) is obtained by polymerizing a vinyl-based monomer component (m1) in the presence of a composite rubber polymer (A).

The composite rubber polymer (A) is composed of a polyorganosiloxane (Aa) and a poly(meth)acrylate ester (Ab).

The (meth)acrylate ester resin (C) is obtained by polymerizing a vinyl-based monomer component (m2).

The styrene-based resin (E) is obtained by polymerizing a vinyl-based monomer component (m3).

The graft copolymer (I) is obtained by polymerizing a vinyl-based monomer component (m4) in the presence of an olefin-based copolymer.

The graft copolymer (I) is preferably obtained by polymerizing the vinyl-based monomer component (m4) in the presence of an ethylene/α-olefin copolymer (F), an olefin resin aqueous dispersion (G) or a crosslinked ethylene/α-olefin copolymer (H).

Each of these components ((A) to (I), and (m1) to (m4) and the like) is described below.

<Polyorganosiloxane (Aa)>

Although there are no particular limitations on the polyorganosiloxane (Aa), a polyorganosiloxane having a vinyl polymerizable functional group is preferred, and a polyorganosiloxane containing 0.3 to 3 mol % of siloxane units containing a vinyl polymerizable functional group and 97 to 99.7 mol % of dimethylsiloxane units relative to the total number of moles of all the structural units constituting the polyorganosiloxane, and containing not more than 1 mol % of silicon atoms having 3 or more siloxane linkages relative to the total number of moles of all the silicon atoms is particularly preferred.

Examples of the dimethylsiloxane that constitutes the polyorganosiloxane (Aa) include dimethylsiloxane-based cyclic compounds having a 3-membered or larger ring. Among such compounds, 3- to 7-membered cyclic compounds are preferred. Specific examples include hexamethylcyclotrisiloxane, octamethylcyclotetrasiloxane, decamethylcyclopentasiloxane and dodecamethylcyclohexasiloxane. These compounds may be used individually, or a combination of two or more compounds may be used.

There are no particular limitations on the siloxane containing a vinyl polymerizable functional group, provided it contains a vinyl polymerizable functional group and can form a bond with a dimethylsiloxane via a siloxane bond, but if consideration is given to the reactivity with the dimethylsiloxane, then an alkoxysilane compound containing a vinyl polymerizable functional group is preferred. Specific examples of such compounds include methacryloyloxysiloxanes such as β-methacryloyloxyethyl dimethoxymethylsilane, γ-methacryloyloxypropyl dimethoxymethylsilane, γ-methacryloyloxypropyl methoxydimethylsilane, γ-methacryloyloxypropyl trimethoxysilane, γ-methacryloyloxypropyl ethoxydiethylsilane, γ-methacryloyloxypropyl diethoxymethylsilane and δ-methacryloyloxybutyl diethoxymethylsilane, vinylsiloxanes such as tetramethyltetravinylcyclotetrasiloxane, and vinylphenylsiloxanes such as p-vinylphenyldimethoxymethylsilane. These vinyl polymerizable functional group-containing siloxanes may be used individually, or a combination of two or more compounds may be used.

If required, the polyorganosiloxane (Aa) may also include a siloxane-based crosslinking agent as a component.

Examples of this siloxane-based crosslinking agent include trifunctional or tetrafunctional silane-based crosslinking agents such as trimethoxymethylsilane, triethoxyphenylsilane, tetramethoxysilane, tetraethoxysilane and tetrabutoxysilane.

There are no particular limitations on the method used for producing the polyorganosiloxane (Aa). For example, the polyorganosiloxane (Aa) may be produced using the method described below.

First, a siloxane-based crosslinking agent is added as required to a siloxane mixture containing the dimethylsiloxane and the siloxane containing a vinyl polymerizable functional group, and the resulting mixture is then emulsified using an emulsifier and water, thus obtaining a siloxane mixture aqueous dispersion containing the siloxane mixture dispersed in an aqueous medium. Subsequently, the dispersed particles (siloxane mixture) within the siloxane mixture aqueous dispersion are subjected to microparticulation using a device such as a homomixer that causes microparticulation by the shearing force generated by high-speed rotation or a homogenizer that causes microparticulation by the ejection force from a high-pressure generator. Using a high-pressure emulsification device such as a homogenizer is preferred, as it enables a reduction in the particle size distribution of the dispersed particles, namely the polyorganosiloxane (Aa). Subsequently, the microparticulated siloxane mixture aqueous dispersion is added to an aqueous acid solution containing an acid catalyst, and a polymerization is performed under high-temperature conditions. The reaction liquid is then cooled, and the polymerization reaction is stopped by neutralization using an alkaline substance such as sodium hydroxide, potassium hydroxide or sodium carbonate, thus obtaining an aqueous dispersion containing the polyorganosiloxane (Aa) dispersed in an aqueous medium.

Examples of the aqueous medium include water, organic solvents that are miscible with water (hereafter also referred to as "water-miscible organic solvents"), and mixtures of such solvents with water. Specific examples of the water-miscible organic solvents include alcohols such as methanol, ethanol, n-propanol and isopropanol, ketones such as acetone and methyl ethyl ketone, polyalkylene glycols such as ethylene glycol, diethylene glycol and propylene glycol, polyalkylene glycol alkyl ethers, and lactams such as N-methyl-2-pyrrolidone. In the present invention, for the aqueous medium, the use of either water by itself, or a mixture of water and a water-miscible solvent is preferred.

The emulsifier used during production of the polyorganosiloxane (Aa) is preferably an anionic emulsifier. Examples of the anionic emulsifier include sodium alkylbenzene sulfonates, sodium alkyl sulfonates (such as sodium lauryl sulfonate), and sodium polyoxyethylene nonylphenyl ether sulfates. Among these, sulfonate-based emulsifiers such as sodium alkylbenzene sulfonates and sodium alkyl sulfonates are preferred. These emulsifiers are preferably used in an amount within a range from about 0.05 parts by mass to 5 parts by mass per 100 parts by mass of the siloxane mixture (solid fraction).

Examples of the acid catalyst used in the polymerization include sulfonic acids such as aliphatic sulfonic acids, aliphatic substituted benzenesulfonic acids and aliphatic substituted naphthalenesulfonic acids, and mineral acids such as sulfuric acid, hydrochloric acid and nitric acid. These acids may be used individually, or a combination of two or more acids may be used.

Among these acids, from the viewpoint of achieving a superior stabilizing action on the aqueous dispersion of the polyorganosiloxane (Aa), aliphatic substituted benzenesulfonic acids are preferred, and n-dodecylbenzenesulfonic acid is particularly preferred. Further, by using a combination of n-dodecylbenzenesulfonic acid and a mineral acid such as sulfuric acid, any effect of the emulsifier used in the aqueous dispersion of the polyorganosiloxane (Aa) on the coloration of the thermoplastic resin composition can be suppressed to a minimum.

From the viewpoints of obtaining excellent coloration and abrasion resistance for the molded article, and suppressing any increase in viscosity or the generation of coagulum during production of the polyorganosiloxane (Aa), the volume average particle size of the polyorganosiloxane (Aa) in the aqueous dispersion is preferably from 0.01 to 0.09 μm, and more preferably from 0.02 to 0.08 μm.

The volume average particle size is a value measured using a laser diffraction and scattering method. Specifically, the volume average particle size is measured using the method described below in the examples.

The method disclosed in Japanese Unexamined Patent Application, First Publication No. Hei 05-279434 may be used to control the volume average particle size of the polyorganosiloxane (Aa).

<Poly(meth)acrylate ester (Ab)>

The poly(meth)acrylate ester (Ab) is a copolymer having units derived from a (meth)acrylate ester and either one of, or both, units derived from a crosslinking agent and units derived from a graft-linking agent.

In the poly(meth)acrylate ester (Ab), a (meth)acrylate ester which corresponds with a crosslinking agent or graft-linking agent is deemed to be a crosslinking agent or graft-linking agent rather than a (meth)acrylate ester.

Examples of the (meth)acrylate esters include alkyl (meth)acrylate esters having an alkyl group with a carbon number of 1 to 12, and (meth)acrylate esters having an aromatic hydrocarbon group such as a phenyl group or a benzyl group. Specifically, n-butyl acrylate, 2-ethylhexyl acrylate and ethyl acrylate are preferred as the (meth)acrylate ester. These (meth)acrylate esters may be used individually, or a combination of two or more (meth)acrylate esters may be used.

A crosslinking agent and a graft-linking agent can each improve the impact resistance, coloration and heat aging resistance of the molded article.

Examples of the crosslinking agent include dimethacrylate-based compounds, and specific examples include ethylene glycol dimethacrylate, propylene glycol dimethacrylate, 1,3-butylene glycol dimethacrylate and 1,4-butylene glycol dimethacrylate.

Examples of the graft-linking agent include allyl compounds, and specific examples include allyl methacrylate, triallyl cyanurate and triallyl isocyanurate.

From the viewpoints of achieving superior impact resistance, coloration and heat aging resistance for the molded article, and reducing the amount of coagulum generated during production of the graft copolymer (B), the combined total of the units derived from the crosslinking agent and the units derived from the graft-linking agent in the poly(meth)acrylate ester (Ab) is preferably from 0.1 to 5% by mass, more preferably from 0.2 to 3% by mass, and still more preferably from 0.5 to 2% by mass, relative to a value of 100% by mass for the total of all the units constituting the poly(meth)acrylate ester (Ab).

<Composite Rubber Polymer (A)>

The composite rubber polymer (A) is formed from the polyorganosiloxane (Aa) and the poly(meth)acrylate ester (Ab).

The composite rubber polymer (A) typically has a structure in which the polyorganosiloxane (Aa) and the poly(meth)acrylate ester (Ab) are mutually intertwined or chemically bonded at the micro level.

The amount of the polyorganosiloxane (Aa) relative to the total mass (100% by mass) of the composite rubber polymer (A) is preferably from 1 to 20% by mass, and more preferably from 3 to 18% by mass. Provided the amount of the polyorganosiloxane (Aa) is at least as large as the lower limit of the above range, the impact resistance and abrasion resistance of the molded article are particularly superior, whereas provided the amount is not more than the upper limit, the impact resistance is particularly superior.

There are no particular limitations on the method used for producing the composite rubber polymer (A). Specific examples of the production method include a method in which an aqueous dispersion of the polyorganosiloxane (Aa) and a separately prepared aqueous dispersion of the poly(meth)acrylate ester (Ab) are subjected to hetero aggregation or coenlargement, and a method in which one of the polymers among the polyorganosiloxane (Aa) and the poly(meth)acrylate ester (Ab) is formed within an aqueous dispersion of the other polymer, thus forming a composite of the two polymers. These methods yield an aqueous dispersion of the composite rubber polymer (A).

Among the above methods for producing the composite rubber polymer (A), from the viewpoint of achieving excellent impact resistance and coloration for the molded article, a method in which a monomer component containing a (meth)acrylate ester-based monomer and either one of, or both, a crosslinking agent and a graft-linking agent is subjected to emulsion polymerization within an aqueous dispersion of the polyorganosiloxane (Aa) is preferred. For example, an aqueous dispersion of the composite rubber polymer (A) can be obtained by adding an emulsifier and the monomer component to an aqueous dispersion of the polyorganosiloxane (Aa) at room temperature, raising the temperature to 40 to 80° C., adding a radical polymerization initiator, and then performing polymerization for about 0.5 to 3 hours.

Specific examples of the emulsifier used in the emulsion polymerization include sodium salts or potassium salts of fatty acids such as oleic acid, stearic acid, myristic acid, stearic acid and palmitic acid, as well as sodium lauryl sulfate, sodium N-lauroyl sarcosinate, dipotassium alkenyl succinate, sodium alkyl diphenyl ether disulfonate, and sodium polyoxyethylene alkyl phenyl ether sulfate.

From the viewpoint of enabling better suppression of gas generation during molding of the thermoplastic resin composition, acid-type emulsifiers containing two or more functional groups per molecule or salts thereof are preferred as the emulsifier, and among such emulsifiers, dipotassium alkenyl succinate or sodium alkyl diphenyl ether disulfonate is particularly preferred.

Examples of the radical polymerization initiator include peroxides, azo-based initiators, and redox initiators containing a combination of an oxidizing agent and a reducing agent. Among these, redox initiators are preferred, and a sulfoxylate-based initiator containing a ferrous sulfate-disodium ethylenediaminetetraacetate-rongalit-hydroperoxide combination is particularly preferred.

The volume average particle size of the composite rubber polymer (A) dispersed in the aqueous dispersion is from 0.05 to 0.15 μm, and preferably from 0.07 to 0.13 μm.

In other words, the graft copolymer (B) is obtained by polymerizing the vinyl-based monomer component (m1) in the presence of the composite rubber polymer (A) having a volume average particle size of 0.05 to 0.15 μm, and the thermoplastic resin composition contains the composite rubber polymer (A) having a volume average particle size of 0.05 to 0.15 μm derived from the graft copolymer (B).

Provided the volume average particle size of the composite rubber polymer (A) is at least as large as the lower limit of the above range, the impact resistance of the molded article is superior, whereas provided the volume average particle size is not more than the upper limit of the above range, the coloration, abrasion resistance, heat aging resistance and weather resistance of the molded article are superior.

There are no particular limitations on the method used for controlling the volume average particle size of the composite rubber polymer (A), and examples include methods in which the type of emulsifier or the amount of emulsifier used is adjusted according to need.

The fact that the volume average particle size of the composite rubber polymer (A) in the aforementioned aqueous dispersion indicates the volume average particle size of the composite rubber polymer (A) within the thermoplastic resin composition can be confirmed by image analysis using an electron microscope.

<Vinyl-Based Monomer Component (m1)>

The vinyl-based monomer component (m1) contains at least an aromatic vinyl compound and a vinyl cyanide compound as monomers.

The vinyl-based monomer component (m1) may also contain other copolymerizable monomers besides the aromatic vinyl compound and the vinyl cyanide compound, provided this does not impair the effects of the present invention.

Examples of the aromatic vinyl compound include styrene, α-methylstyrene, o-, m- or p-methylstyrene, vinylxylene, p-t-butylstyrene and ethylstyrene. Among these, styrene and α-methylstyrene are preferred. These compounds may be used individually, or a combination of two or more compounds may be used.

Examples of the vinyl cyanide compound include acrylonitrile and methacrylonitrile. These compounds may be used individually, or a combination of two or more compounds may be used.

Examples of the other monomers include methacrylate esters, acrylate esters and maleimide-based compounds.

Specific examples of the methacrylate esters include methyl methacrylate, ethyl methacrylate, n-propyl methacrylate, i-propyl methacrylate, n-butyl methacrylate, i-butyl methacrylate, t-butyl methacrylate, amyl methacrylate, isoamyl methacrylate, octyl methacrylate, 2-ethylhexyl methacrylate, decyl methacrylate, lauryl methacrylate, cyclohexyl methacrylate, benzyl methacrylate and phenyl methacrylate.

Examples of the acrylate esters include methyl acrylate, ethyl acrylate, propyl acrylate and butyl acrylate.

Examples of the maleimide-based compounds include N-alkylmaleimides (such as N-methylmaleimide, N-ethylmaleimide, N-n-propylmaleimide, N-i-propylmaleimide, N-n-butylmaleimide, N-i-butylmaleimide, N-tert-butylmaleimide and N-cyclohexylmaleimide), N-arylmaleimides (such as N-phenylmaleimide, N-alkyl-substituted phenylmaleimides and N-chlorophenylmaleimide), and other N-substituted maleimide compounds such as N-aralkylmaleimides.

These compounds may be used individually, or a combination of two or more compounds may be used.

In the vinyl-based monomer component (m1), the amount of the aromatic vinyl compound relative to the total mass (100% by mass) of the vinyl-based monomer component (m1) is preferably from 65 to 82% by mass, more preferably from 73 to 80% by mass, and still more preferably from 75 to 80% by mass. Provided the amount of the aromatic vinyl compound relative to the total mass of the vinyl-based monomer component (m1) falls within the above range, the coloration and impact resistance of the molded article are particularly superior.

The amount of the vinyl cyanide compound relative to the total mass (100% by mass) of the vinyl-based monomer component (m1) is preferably from 18 to 35% by mass, more preferably from 20 to 27% by mass, and still more preferably from 20 to 25% by mass. Provided the amount of the vinyl cyanide compound relative to the total mass of the vinyl-based monomer component (m1) falls within the above range, the coloration and impact resistance of the molded article are particularly superior.

Accordingly, relative to the total mass (100% by mass) of the vinyl-based monomer component (m1), it is preferable that the amount of the aromatic vinyl compound is from 65 to 82% by mass and the amount of the vinyl cyanide compound is from 18 to 35% by mass, more preferable that the amount of the aromatic vinyl compound is from 73 to 80% by mass and the amount of the vinyl cyanide compound is from 20 to 27% by mass, and still more preferable that the amount of the aromatic vinyl compound is from 75 to 80% by mass and the amount of the vinyl cyanide compound is from 20 to 25% by mass.

<Graft Copolymer (B)>

The graft copolymer (B) is obtained by polymerizing the vinyl-based monomer component (m1) in the presence of the composite rubber polymer (A).

The graft copolymer (B) is a copolymer having graft chains formed from the polymer of the vinyl-based monomer component (m1) bonded to the particulate composite rubber polymer (A) having a volume average particle size of 0.05 to 0.15 μm, and is composed of a core portion formed from the composite rubber polymer (A) and an outer layer portion formed from the polymer of the vinyl-based monomer component (m1).

The graft copolymer (B) is preferably obtained by polymerizing 10 to 80% by mass of the vinyl-based monomer component (m1) in the presence of 20 to 90% by mass of the composite rubber polymer (A) (provided that the combination of the composite rubber polymer (A) and the vinyl-based monomer component (m1) totals 100% by mass), is more preferably obtained by polymerizing 15 to 75% by mass of the vinyl-based monomer component (m1) in the presence of 25 to 85% by mass of the composite rubber polymer (A), and is still more preferably obtained by polymerizing 20 to 70% by mass of the vinyl-based monomer component (m1) in the presence of 30 to 80% by mass of the composite rubber polymer (A).

In other words, the graft copolymer (B) is preferably composed of 20 to 90% by mass of the composite rubber polymer (A) and 10 to 80% by mass of the polymer of the vinyl-based monomer component (m1) (provided that the combination of the composite rubber polymer (A) and the polymer of the vinyl-based monomer component (m1) totals 100% by mass), is more preferably composed of 25 to 85% by mass of the composite rubber polymer (A) and 15 to 75% by mass of the polymer of the vinyl-based monomer component (m1), and is still more preferably composed of 30 to 80% by mass of the composite rubber polymer (A) and 20 to 70% by mass of the polymer of the vinyl-based monomer component (m1).

Provided the amount of the composite rubber polymer (A) within 100% by mass of the combination of the composite rubber polymer (A) and the vinyl-based monomer component (m1) falls within the above range, the productivity of the graft copolymer (B) is favorable, and the coloration and impact resistance of the molded article are particularly superior.

The graft copolymer (B) is produced, for example, by emulsion polymerization. In other words, the graft copolymer (B) can be produced by adding the vinyl-based monomer component (m1) to an aqueous dispersion of the composite rubber polymer (A), and then subjecting the vinyl-based monomer component (m1) to a radical polymerization in the presence of an emulsifier. This yields an aqueous dispersion of the graft copolymer (B). During this process, any of various known chain transfer agents may be added to control the graft ratio and the molecular weight of the grafted component.

There are no particular limitations on the polymerization conditions for the radical polymerization, and suitable polymerization conditions include reaction for 1 to 4 hours at 60 to 90° C.

Examples of the radical polymerization initiator used during the radical polymerization include peroxides, azo-based initiators, and redox initiators containing a combination of an oxidizing agent and a reducing agent. Among these, redox initiators are preferred, and a sulfoxylate-based initiator containing a ferrous sulfate-disodium ethylenediaminetetraacetate-rongalit-hydroperoxide combination is particularly preferred.

Examples of the emulsifier include the types of emulsifiers used in producing the composite rubber polymer (A). The emulsifier contained within the composite rubber polymer (A) may be used, as is, meaning additional emulsifier need not be added when polymerizing the vinyl-based monomer component (m1), but additional emulsifier may be added for the polymerization of the vinyl-based monomer component (m1) if required.

Examples of the method used for recovering the graft copolymer (B) from the aqueous dispersion of the graft copolymer (B) include (i) a method in which the aqueous dispersion of the graft copolymer (B) is added to hot water containing a dissolved coagulant to precipitate the graft copolymer (B), which is then recovered from the slurry state (wet method), and (ii) a method in which the aqueous dispersion of the graft copolymer (B) is sprayed within a heated atmosphere, and the graft copolymer (B) is then collected in a semi-direct manner (spray-dry method).

Examples of the coagulant include inorganic acids such as sulfuric acid, hydrochloric acid, phosphoric acid and nitric acid, and metal salts such as calcium chloride, calcium acetate and aluminum sulfate. The coagulant is selected in accordance with the emulsifier used in the polymerization. That is, when a carboxylic acid soap such as a fatty acid soap or rosin acid soap is used alone, any coagulant may be used. When the emulsifier includes an emulsifier that exhibits stable emulsifying capacity even under acidic conditions such as sodium dodecylbenzenesulfonate, it is necessary to use a metal salt.

Examples of the method used for obtaining a dried graft copolymer (B) from a slurry of the graft copolymer (B) include methods in which emulsifier residues in the slurry are first eluted by washing in water, and then either treatment (i-1) or (i-2) described below is performed.

(i-1) The slurry is dewatered using a centrifugal dewatering device or a press dewatering device, and drying is then performed using a flash dryer or the like.

(i-2) The slurry is simultaneously dehydrated and dried using a squeezing-type dehydrator or an extruder or the like.

Following drying, the graft copolymer (B) is obtained in a powdered or particulate state. Further, the graft copolymer (B) discharged from the squeezing-type dehydrator or extruder may be transfer directly to the extruder or molding machine used for preparing the thermoplastic resin composition.

<Vinyl-Based Monomer Component (m2)>

The vinyl-based monomer component (m2) contains at least a (meth)acrylate ester, a maleimide-based compound and an aromatic vinyl compound as monomers.

The vinyl-based monomer component (m2) may also contain other copolymerizable monomers besides the (meth)acrylate ester, the maleimide-based compound and the aromatic vinyl compound, provided this does not impair the effects of the present invention.

Examples of the (meth)acrylate ester include alkyl (meth)acrylate esters having an alkyl group with a carbon number of 1 to 12, and (meth)acrylate esters having an aromatic hydrocarbon group such as a phenyl group or a benzyl group. These (meth)acrylate esters may be used individually, or a combination of two or more (meth)acrylate esters may be used. Methyl methacrylate is preferred as the (meth)acrylate ester.

Examples of the maleimide-based compound include N-alkylmaleimides (such as N-methylmaleimide, N-ethylmaleimide, N-n-propylmaleimide, N-i-propylmaleimide, N-n-butylmaleimide, N-i-butylmaleimide, N-tert-butylmaleimide and N-cyclohexylmaleimide), N-arylmaleimides (such as N-phenylmaleimide, N-alkyl-substituted phenylmaleimides and N-chlorophenylmaleimide), and other N-substituted maleimide compounds such as N-aralkylmaleimides. These compounds may be used individually, or a combination of two or more compounds may be used.

In terms of achieving superior coloration and weather resistance for the molded article, the maleimide-based compound preferably includes at least one of N-cyclohexylmaleimide and N-phenylmaleimide, and most preferably includes both N-cyclohexylmaleimide and N-phenylmaleimide.

Examples of the aromatic vinyl compound include styrene, α-methylstyrene, o-, m- or p-methylstyrene, vinylxylene, p-t-butylstyrene and ethylstyrene. Among these, styrene and α-methylstyrene are preferred. These compounds may be used individually, or a combination of two or more compounds may be used.

Examples of the other monomers include vinyl cyanide compounds (such as acrylonitrile and methacrylonitrile). These other monomers may be used individually, or a combination of two or more monomers may be used.

In the vinyl-based monomer component (m2), the amount of the (meth)acrylate ester relative to the total mass (100% by mass) of the vinyl-based monomer component (m2) is preferably from 55 to 93.5% by mass, and more preferably from 60 to 84.5% by mass. Provided the amount of the (meth)acrylate ester relative to the total mass of the vinyl-based monomer component (m2) falls within the above range, the impact resistance, coloration, scratching resistance, weather resistance and heat aging resistance of the molded article are particularly superior.

The amount of the maleimide-based compound relative to the total mass (100% by mass) of the vinyl-based monomer component (m2) is from 1 to 30% by mass, preferably from 10 to 30% by mass, and still more preferably from 10 to 20% by mass. Provided the amount of the maleimide-based compound relative to the total mass of the vinyl-based monomer component (m2) is at least as large as the lower limit or the above range, the heat resistance and heat aging resistance of the molded article are particularly superior, whereas provided the amount is not more than the upper limit of the above range, the coloration and weather resistance of the molded article are particularly superior.

The amount of the aromatic vinyl compound relative to the total mass (100% by mass) of the vinyl-based monomer component (m2) is from 5.5 to 15% by mass, and preferably from 5.5 to 10% by mass. Provided the amount of the aromatic vinyl compound relative to the total mass of the vinyl-based monomer component (m2) falls within the above range, the balance between the fluidity of the thermoplastic resin composition, and the coloration and weather resistance of the molded article is excellent.

<(Meth)Acrylate Ester Resin (C)>

The (meth)acrylate ester resin (C) is obtained by polymerizing the vinyl-based monomer component (m2). In other words, the (meth)acrylate ester resin (C) is a polymer of the vinyl-based monomer component (m2), and contains at least units derived from the (meth)acrylate ester, units derived from the maleimide-based compound and units derived from the aromatic vinyl compound, wherein the amount of the units derived from the maleimide-based compound is from 1 to 30% by mass relative to the total mass (100% by mass) of all of the units, and the amount of the units derived from the aromatic vinyl compound is from 5.5 to 15% by mass relative to the total mass (100% by mass) of all of the units.

There are no limitations on the polymerization method for the vinyl-based monomer component (m2), and conventional polymerization methods (such as emulsion polymerization methods, suspension polymerization methods and solution polymerization methods) may be used.

One example of a method for producing the (meth) acrylate ester resin (C) using an emulsion polymerization method is a method in which a reactor is charged with the vinyl-based monomer component (m2), an emulsifier, a polymerization initiator and a chain transfer agent, polymerization is conducted by heating, and a precipitation method is then used to recover the (meth)acrylate ester resin (C) from the resulting aqueous dispersion containing the (meth)acrylate ester resin (C).

There are no particular limitations on the polymerization conditions for the emulsion polymerization, and suitable polymerization conditions include reaction for 1 to 15 hours at 40 to 120° C.

Examples of the emulsifier include typical emulsifiers for emulsion polymerization (such as potassium rosinate and sodium alkylbenzene sulfonate).

Examples of the polymerization initiator include organic and inorganic peroxide-based initiators.

Examples of the chain transfer agent include mercaptans, α-methylstyrene dimer, and terpenes.

For the precipitation method, a similar method to that used when recovering the graft copolymer (B) from an aqueous dispersion may be employed.

One example of a method for producing the (meth) acrylate ester resin (C) using a suspension polymerization method is a method in which a reactor is charged with the vinyl-based monomer component (m2), a suspension agent, a suspension assistant, a polymerization initiator and a chain transfer agent, polymerization is conducted by heating, and the obtained slurry is dewatered and dried to recover the (meth)acrylate ester resin (C).

There are no particular limitations on the polymerization conditions for the suspension polymerization, and suitable polymerization conditions include reaction for 1 to 15 hours at 40 to 120° C.

Examples of the suspension agent include tricalcium phosphite and polyvinyl alcohol.

Examples of the suspension assistant include sodium alkylbenzene sulfonate.

Examples of the polymerization initiator include organic peroxides.

Examples of the chain transfer agent include mercaptans, α-methyl styrene dimer, and terpenes.

The weight-average molecular weight (Mw) of the (meth) acrylate ester resin (C) is preferably from 100,000 to 300,000, and more preferably from 120,000 to 220,000. Provided the weight-average molecular weight of the (meth) acrylate ester resin (C) falls within this range, the fluidity of the thermoplastic resin composition, and the impact resistance, coloration, scratching resistance and heat aging resistance of the molded article are particularly superior.

The weight-average molecular weight (Mw) of the (meth) acrylate ester resin (C) describes the value obtained by dissolving the resin in tetrahydrofuran (THF), and analyzing the solution by gel permeation chromatography (GPC) by reference against standard polystyrenes (PS).

A single type of the (meth)acrylate ester resin (C) may be used alone, or a combination of two or more types may be used.

<Silicone Oil (D)>

There are no particular limitations on the silicone oil (D), provided it has a polyorganosiloxane structure. For example, either an unmodified silicone oil or a modified silicone oil may be used.

Examples of unmodified silicone oils include dimethyl silicone oil, methyl phenyl silicone oil, and methyl hydrogen silicone oil.

Modified silicone oils are silicone oils in which any of various organic groups have been introduced on a portion of the side chains and/or one terminal portion of the polyorganosiloxane structure or both terminal portions of the polyorganosiloxane structure. Examples of such modified silicone oils include amino-modified silicone oils, alkyl-modified silicone oils, polyether-modified silicone oils, fluorine-modified silicone oils, higher alkoxy-modified silicone oils, higher fatty acid-modified silicone oils, methylstyryl-modified silicone oils, methyl chlorinated phenyl silicone oils, methyl hydrogen silicone oils, epoxy-modified silicone oils, carboxyl-modified silicone oils, acrylic-modified silicone oils, methacrylic-modified silicone oils, mercapto-modified silicone oils, phenol-modified silicone oils, and carbinol-modified silicone oils.

A single type of silicone oil (D) may be used alone, or a combination of two or more types may be used.

<Vinyl-Based Monomer Component (m3)>

The vinyl-based monomer component (m3) contains at least an aromatic vinyl compound and a vinyl cyanide compound as monomers.

The vinyl-based monomer component (m3) may also contain other copolymerizable monomers besides the aromatic vinyl compound and the vinyl cyanide compound, provided this does not impair the effects of the present invention.

Specific examples of the aromatic vinyl compound and the vinyl cyanide compound include the same compounds as those listed above for the vinyl-based monomer component (m1). Preferred compounds are also the same as those mentioned above.

Examples of the other monomers include methacrylate esters, acrylate esters and maleimide-based compounds. Specific examples of these monomers include the same compounds as those listed above for the vinyl-based monomer component (m1). These other monomers may be used individually, or a combination of two or more monomers may be used.

In the vinyl-based monomer component (m3), the amount of the aromatic vinyl compound relative to the total mass (100% by mass) of the vinyl-based monomer component (m3) is preferably from 50 to 90% by mass, and more preferably from 55 to 80% by mass. Provided the amount of the aromatic vinyl compound relative to the total mass of the vinyl-based monomer component (m3) falls within the above range, the fluidity of the obtained thermoplastic resin composition and the coloration of the molded article are particularly superior.

The amount of the vinyl cyanide compound relative to the total mass (100% by mass) of the vinyl-based monomer component (m3) is preferably from 10 to 50% by mass, and more preferably from 20 to 45% by mass. Provided the amount of the vinyl cyanide compound relative to the total mass of the vinyl-based monomer component (m3) falls within the above range, the impact resistance and heat resistance of the molded article are particularly superior.

Accordingly, relative to the total mass (100% by mass) of the vinyl-based monomer component (m3), it is preferable that the amount of the aromatic vinyl compound is from 50 to 90% by mass and the amount of the vinyl cyanide compound is from 10 to 50% by mass, and it is more preferable that the amount of the aromatic vinyl compound is from 55 to 80% by mass and the amount of the vinyl cyanide compound is from 20 to 45% by mass.

<Styrene-Based Resin (E)>

The styrene-based resin (E) is obtained by polymerizing the vinyl-based monomer component (m3). In other words, the styrene-based resin (E) is a polymer of the vinyl-based monomer component (m3), and contains at least units derived from the aromatic vinyl compound and units derived from the vinyl cyanide compound.

There are no limitations on the polymerization method for the vinyl-based monomer component (m3), and conventional polymerization methods (such as emulsion polymerization methods, suspension polymerization methods, bulk polymerization methods, and solution polymerization methods) may be used, but from the viewpoint of the heat resistance of the molded article, a suspension polymerization method or bulk polymerization method is preferred. Any of various conventional chain transfer agents may be added during the polymerization.

There are no particular limitations on the polymerization conditions, and suitable polymerization conditions include reaction for 1 to 20 hours at 40 to 130° C.

Examples of the chain transfer agent include mercaptans, α-methylstyrene dimer, and terpenes.

The weight-average molecular weight of the styrene-based resin (E) is preferably from 70,000 to 200,000, and more preferably from 90,000 to 150,000. Provided the weight-average molecular weight of the styrene-based resin (E) falls within this range, the fluidity of the thermoplastic resin composition and the impact resistance of the molded article are particularly superior.

The weight-average molecular weight (Mw) of the styrene-based resin (E) describes the value obtained by dissolving the resin in tetrahydrofuran (THF), and analyzing the solution by gel permeation chromatography (GPC) by reference against standard polystyrenes (PS).

<Ethylene/α-Olefin Copolymer (F)>

The ethylene/α-olefin copolymer (F) is a copolymer containing ethylene units and α-olefin units, obtained by copolymerizing ethylene and an α-olefin having a carbon number of 3 or more using a conventional polymerization method.

The ethylene/α-olefin copolymer (F) may also contain non-conjugated diene units. Including non-conjugated diene units in the ethylene/α-olefin copolymer (F) yields particularly superior impact resistance and abrasion resistance for the molded article.

Examples of the α-olefin include propylene, 1-butene, 1-pentene, 1-hexene, 1-heptene, 1-octene, 1-decene, 1-undecene, 1-eicosene and 1-docosene, and in terms of the impact resistance of the molded article, an α-olefin having a carbon number of 3 to 20 is preferable, and propylene is particularly preferred.

Examples of the non-conjugated diene include dicyclopentadiene, 5-ethylidene-2-norbornene, 1,4-hexadiene, 1,5-hexadiene, 2-methyl-1,5-hexadiene, 1,4-cycloheptadiene and 1,5-cyclooctadiene. Among these, in terms of achieving excellent impact resistance and abrasion resistance for the obtained molded article, dicyclopentadiene and/or 5-ethylidene-2-norbornene is preferred as the non-conjugated diene unit.

The amount of ethylene units in the ethylene/α-olefin copolymer (F), relative to a value of 100% by mass for the total of all of the units that constitute the ethylene/α-olefin copolymer (F), is preferably from 45 to 80% by mass, and more preferably from 50 to 75% by mass. Provided the amount of ethylene units falls within this range, the balance between the abrasion resistance and the impact resistance of the molded article is particularly superior.

The total amount of the combination of the ethylene units and the α-olefin units, relative to a value of 100% by mass for the total of all of the units that constitute the ethylene/α-olefin copolymer (F), is preferably from 90 to 100% by mass, and more preferably from 95 to 99% by mass. Provided the total amount of the combination of the ethylene units and the α-olefin units falls within this range, the balance between the abrasion resistance and the impact resistance of the molded article is particularly superior.

The weight-average molecular weight (Mw) of the ethylene/α-olefin copolymer (F) is preferably from $4 \times 10^4$ to $35 \times 10^4$, and more preferably from $5 \times 10^4$ to $10 \times 10^4$. Provided the weight-average molecular weight (Mw) is at least $4 \times 10^4$, the abrasion resistance, impact resistance and coloration of the molded article are particularly superior. On the other hand, provided the weight-average molecular weight (Mw) is not more than $35 \times 10^4$, the fluidity of the thermoplastic resin composition is excellent. When the weight-average molecular weight (Mw) is from $5 \times 10^4$ to $10 \times 10^4$, the fluidity of the thermoplastic resin composition, and the abrasion resistance, coloration and impact resistance of the molded article are particularly superior.

The molecular weight distribution (Mw/number-average molecular weight (Mn)) of the ethylene/α-olefin copolymer (F) is preferably from 1.0 to 5.0, and more preferably from 3.1 to 4.0. Provided the molecular weight distribution (Mw/Mn) is not more than 5.0, the abrasion resistance and impact resistance of the molded article are excellent. When the molecular weight distribution (Mw/Mn) is from 3.1 to 4.0, the fluidity of the thermoplastic resin composition, and the abrasion resistance and impact resistance of the molded article are particularly superior.

The weight-average molecular weight (Mw) and the number-average molecular weight (Mn) of the ethylene/α-olefin copolymer (F) represent values measured using gel permeation chromatography (GPC) and referenced against standard polystyrenes.

There are no limitations on the method used for producing the ethylene/α-olefin copolymer (F). The ethylene/α-olefin copolymer (F) is usually produced by copolymerizing the ethylene and the α-olefin, or the ethylene, the α-olefin and the non-conjugated diene, using a metallocene catalyst or a Ziegler-Natta catalyst.

Examples of the metallocene catalyst include catalysts containing a combination of a metallocene complex in which an organic compound having a cyclopentadienyl skeleton or a halogen atom or the like is coordinated to a transition metal (such as zirconium, titanium or hafnium), and an organic aluminum compound or an organic boron compound or the like.

Examples of the Ziegler-Natta catalyst include catalysts containing a combination of a halide of a transition metal (such as titanium, vanadium, zirconium or hafnium), and an organic aluminum compound or an organic boron compound or the like.

Examples of the polymerization method include methods in which the ethylene and the α-olefin, or the ethylene, the α-olefin and the non-conjugated diene, are copolymerized in solution in the presence of the aforementioned catalyst (a metallocene catalyst or a Ziegler-Natta catalyst). Examples of the solvent include hydrocarbon solvents (such as benzene, toluene, xylene, pentane, hexane, heptane and octane). A single hydrocarbon solvent may be used alone, or a combination of two or more solvents may be used. Further, the α-olefin raw material may also be used as a solvent. During the polymerization, a molecular weight modifier such as hydrogen may also be used.

There are no particular limitations on the polymerization conditions, and suitable polymerization conditions include reaction for 1 to 10 hours at 40 to 120° C. and 0.2 to 5 MPa.

The amount of ethylene units in the ethylene/α-olefin copolymer (F), and the weight-average molecular weight (Mw) and molecular weight distribution (Mw/Mn) of the ethylene/α-olefin copolymer (F) can be adjusted by changing the amounts added of the ethylene, α-olefin and non-conjugated diene, the type or amount of the molecular weight modifier such as hydrogen, the type or amount of the catalyst, and the reaction conditions such as the reaction temperature and pressure.

<Olefin Resin Aqueous Dispersion (G)>

The olefin resin aqueous dispersion (G) is obtained by dispersing the ethylene/α-olefin copolymer (F) in an aqueous medium.

The olefin resin aqueous dispersion (G) may also contain an emulsifier or an acid-modified olefin polymer or the like as an additional component.

Conventional emulsifiers may be used as the emulsifier, and examples include long-chain alkyl carboxylates, alkyl sulfosuccinate ester salts, and alkyl benzene sulfonates.

In terms of enabling suppression of thermal coloration of the obtained thermoplastic resin composition, and ease of control of the particle size of the ethylene/α-olefin copolymer (F) dispersed in the olefin resin aqueous dispersion (G), the amount of the emulsifier in the olefin resin aqueous dispersion (G) is preferably from 1 to 8 parts by mass per 100 parts by mass of the ethylene/α-olefin copolymer (F).

Examples of the acid-modified olefin polymer include polymers obtained by modifying an olefin polymer (such as a polyethylene or polypropylene) having a weight-average molecular weight of 1,000 to 5,000 with a compound having a functional group (such as an unsaturated carboxylic acid compound). Specific examples of the unsaturated carboxylic acid include acrylic acid, maleic acid, itaconic acid, maleic anhydride, itaconic anhydride and maleic acid monoamide.

The amount of the acid-modified olefin polymer within the olefin resin aqueous dispersion (G) is preferably from 1 to 40 parts by mass per 100 parts by mass of the ethylene/α-olefin copolymer (F). Provided the amount added of the acid-modified olefin polymer falls within this range, the balance between the scratch resistance and the impact resistance of the molded article is particularly superior.

There are no limitations on the method used for preparing the olefin resin aqueous dispersion (G). Examples of the preparation method include a method (g1) in which the ethylene/α-olefin copolymer (F) is melt-kneaded using a conventional melt-kneading device (such as a kneader, a Banbury mixer or a multi-screw extruder), dispersed by application of a mechanical shear force, and then added to an aqueous medium; and a method (g2) in which the ethylene/α-olefin copolymer (F) is dissolved in a hydrocarbon solvent (such as pentane, hexane, heptane, benzene, toluene or xylene), the solution is added to an aqueous medium to form an emulsion and stirred thoroughly, and the hydrocarbon solvent is then removed by distillation. During this preparation of the olefin resin aqueous dispersion (G), other components such as the acid-modified olefin polymer or an emulsifier or the like may also be added.

There are no limitations on the method used for adding the acid-modified olefin polymer. Examples include a method in which the ethylene/α-olefin copolymer (F) and the acid-modified olefin polymer are mixed and melt-kneaded using the above method (g1), and a method in which the ethylene/α-olefin copolymer (F) and the acid-modified olefin polymer are dissolved in the hydrocarbon solvent in the above method (g2).

There are no limitations on the method used for mixing the ethylene/α-olefin copolymer (F) and the acid-modified olefin polymer. Examples of the mixing method include melt-kneading methods using a kneader, a Banbury mixer, or a multi-screw extruder or the like. In such cases, the process of mixing the ethylene/α-olefin copolymer (F) and the acid-modified olefin polymer may incorporate a step of melt-kneading the mixture of the two components.

There are no limitations on the method used for adding the emulsifier. For example, the same methods as those used for adding the acid-modified olefin polymer may be used. Specific examples include a method in which the emulsifier is added to the aqueous medium in the above method (g1) of (g2), and a method in which the emulsifier is dissolved in the hydrocarbon solvent in the above method (g2).

In terms of achieving superior physical properties for the molded article, the volume average particle size of the ethylene/α-olefin copolymer (F) that forms the olefin resin aqueous dispersion (G) is preferably from 0.20 to 0.60 µm, and more preferably from 0.30 to 0.50 µm.

In other words, it is preferable that the graft copolymer (I) is obtained by polymerizing the vinyl-based monomer component (m1) in the presence of an ethylene/α-olefin copolymer (F) having a volume average particle size of 0.20 to 0.60 µm, and that the thermoplastic resin composition includes the ethylene/α-olefin copolymer (F) having a volume average particle size of 0.20 to 0.60 µm within the graft copolymer (I).

Provided this volume average particle size is at least 0.20 µm, the impact resistance of the molded article is particularly superior. Provided the volume average particle size is not more than 0.60 µm, the impact resistance, coloration, abrasion resistance and heat aging resistance of the molded article are particularly superior. If the volume average particle size of the ethylene/α-olefin copolymer (F) is from 0.3 to 0.5 µm, then the impact resistance, coloration, abrasion resistance and heat aging resistance of the molded article are even more superior.

The fact that the volume average particle size of the ethylene/α-olefin copolymer (F) that forms the olefin resin aqueous dispersion (G) indicates, with no change, the volume average particle size of the ethylene/α-olefin copolymer (F) within the thermoplastic resin composition can be confirmed by image analysis using an electron microscope.

Examples of methods that may be used for controlling the volume average particle size of the ethylene/α-olefin copolymer (F) dispersed in the olefin resin aqueous dispersion (G) include methods in which the type or amount of emulsifier, or the type or amount of acid-modified olefin polymer is altered, and methods in which the shear force applied during kneading or the temperature conditions are altered.

The amount used of the emulsifier is preferably from 1.0 to 10.0% by mass relative to 100% by mass of the ethylene/α-olefin copolymer (F). The amount used of the acid-modified olefin polymer is preferably from 5.0 to 30.0% by mass relative to the ethylene/α-olefin copolymer (F). The temperature during kneading is preferably from 100 to 300° C.

<Crosslinked Ethylene/α-Olefin Copolymer (H)>

The crosslinked ethylene/α-olefin copolymer (H) is obtained by subjecting the ethylene/α-olefin copolymer (F), or the ethylene/α-olefin copolymer (F) dispersed within the olefin resin aqueous dispersion (G), to a crosslinking treatment. Performing the crosslinking treatment yields a superior balance between the abrasion resistance, the impact resistance and the coloration of the molded article.

In terms of the balance between the abrasion resistance, impact resistance and coloration of the molded article, the gel content ratio of the crosslinked ethylene/α-olefin copolymer (H) is preferably from 35 to 85% by mass, more preferably from 45 to 80% by mass, and still more preferably from 60 to 75% by mass.

The gel content ratio in the present invention is obtained by swelling the crosslinked ethylene/α-olefin copolymer (H) in toluene, and is calculated as the ratio of the dried toluene-insoluble fraction relative to the crosslinked ethylene/α-olefin copolymer (H) prior to swelling. Specifically, the gel content ratio can be determined by the method described in the examples.

The crosslinking treatment of the ethylene/α-olefin copolymer (F) or the olefin resin aqueous dispersion (G) can be conducted using a conventional method. Examples of the crosslinking treatment method include a method (a) in which the crosslinking treatment is performed by adding an organic peroxide, and if necessary a polyfunctional compound, and a method (b) in which the crosslinking treatment is performed by ionizing radiation, but in terms of the impact resistance and the coloration of the molded article, method (a) is preferred.

In a specific example of the method (a), an organic peroxide, and if necessary a polyfunctional compound, are added to the ethylene/α-olefin copolymer (F) or the olefin resin aqueous dispersion (G), and heating is then performed.

For example, if an organic peroxide, and where necessary a polyfunctional compound, are added to the ethylene/α-olefin copolymer (F), and then melt-kneading and grinding are performed, a powder of the crosslinked ethylene/α-olefin copolymer (H) can be obtained. If necessary, the ground product obtained following grinding may be subjected to a classification treatment or the like. If an organic peroxide, and where necessary a polyfunctional compound, are added to the olefin resin aqueous dispersion (G), and a crosslinking treatment is then performed, an aqueous dispersion of the crosslinked ethylene/α-olefin copolymer (H) can be obtained.

By altering the amounts added of the organic peroxide and the polyfunctional compound, the heating temperature, and the heating time and the like, the gel content ratio of the crosslinked ethylene/α-olefin copolymer (H) can be adjusted.

The heating temperature differs depending on the type of organic peroxide used. The heating temperature is preferably within a range from −5° C. to +30° C. from the ten-hour half-life temperature of the organic peroxide.

The healing time is preferably from 3 to 15 hours.

The organic peroxide is used for forming crosslinked structures in the ethylene/α-olefin copolymer (F). Examples of the organic peroxide include peroxy ester compounds, peroxy ketal compounds and dialkyl peroxide compounds. A single organic peroxide may be used alone, or a combination of two or more organic peroxides may be used.

From the viewpoint of facilitating adjustment of the gel content ratio of the olefin resin aqueous dispersion (G), a dialkyl peroxide compound is particularly preferred as the organic peroxide.

Specific examples of such dialkyl peroxide compounds include α,α'-bis(t-butylperoxy)diisopropylbenzene, dicumyl peroxide, 2,5-dimethyl-2,5-bis(t-butylperoxy)hexane, t-butyl cumyl peroxide, di-t-butyl peroxide, and 2,5-dimethyl-2,5-bis(t-butylperoxy)hexyne-3.

In terms of facilitating adjustment of the gel content ratio of the crosslinked ethylene/α-olefin copolymer (H) to a value within a range from 35 to 85% by mass, the amount added of the organic peroxide is preferably from 0.1 to 5 parts by mass per 100 parts by mass of ethylene/α-olefin copolymer (F).

The polyfunctional compound is a compound which, if necessary, may be used in combination with the organic peroxide in order to adjust the gel content ratio of the crosslinked ethylene/α-olefin copolymer (H).

Examples of the polyfunctional compound include divinylbenzene, allyl methacrylate, ethylene glycol dimethacrylate, 1,3-butylene dimethacrylate, tetraethylene glycol diacrylale, triallyl cyanurate, triallyl isocyanurale and pentaerythritol tetraacrylate, and in terms of facilitating adjustment of the gel content ratio easily, divinylbenzene is preferred. A single polyfunctional compound may be used alone, or a combination of two or more polyfunctional compounds may be used.

In terms of facilitating adjustment of the gel content ratio of the crosslinked ethylene/α-olefin copolymer (H) to a value within a range from 35 to 85% by mass, the amount added of the polyfunctional compound is preferably from 1 to 5 parts by mass per 100 parts by mass of ethylene/α-olefin copolymer (F).

When subjecting the ethylene/α-olefin copolymer (F) to the crosslinking treatment to obtain the crosslinked ethylene/α-olefin copolymer (H), an acid-modified olefin polymer may be added to the ethylene/α-olefin copolymer (F).

The acid-modified olefin polymer may be the same as that described above in relation to the olefin resin aqueous dispersion (G). The amount added of the acid-modified polymer may be similar to the amount of acid-modified polymer added to the olefin resin aqueous dispersion (G), namely an amount of 1 to 40 parts by mass per 100 parts by mass of the ethylene/α-olefin copolymer (F).

There are no limitations on the method used for adding the acid-modified olefin polymer. The ethylene/α-olefin copolymer (F) and the acid-modified olefin polymer may be first mixed together, and the crosslinking treatment then performed, or the ethylene/α-olefin copolymer (F) and the acid-modified olefin polymer may be subjected to separate crosslinking treatments and then mixed together.

There are no limitations on the method used for mixing the ethylene/α-olefin copolymer (F) and the acid-modified olefin polymer. Examples of the mixing method include melt-kneading methods using a kneader, a Banbury mixer or a multi-screw extruder or the like.

In terms of achieving excellent physical properties for the molded article, the volume average particle size of the crosslinked ethylene/α-olefin copolymer (H), or the volume average particle size of the crosslinked ethylene/α-olefin copolymer (H) within the aqueous dispersion, is preferably from 0.2 to 0.6 μm, and more preferably from 0.3 to 0.5 μm. Provided the volume average particle size is at least 0.2 μm, the impact resistance of the molded article is particularly superior. Provided the volume average particle size is not more than 0.6 μm, the impact resistance, coloration, abrasion resistance and heat aging resistance of the molded article are particularly superior. If the volume average particle size of the crosslinked ethylene/α-olefin copolymer (H) is from 0.3 μm to 0.5 μm, then the impact resistance, coloration, abrasion resistance and heat aging resistance of the molded article are even more superior.

The volume average particle size of the crosslinked ethylene/α-olefin copolymer (H) within the aqueous dispersion of the crosslinked ethylene/α-olefin copolymer (H) obtained by subjecting the olefin resin aqueous dispersion (G) to a crosslinking treatment with an organic peroxide does not differ from the volume average particle size of the ethylene/α-olefin copolymer (F) within the olefin resin aqueous dispersion (G). In other words, the crosslinking reaction of the ethylene/α-olefin copolymer (F) proceeds at the surface or within the interior of the particles of the ethylene/α-olefin copolymer (F) in the olefin resin aqueous dispersion (G), and is not accompanied by an increase in particle size.

Further, the fact that the volume average particle size of the crosslinked ethylene/α-olefin copolymer (H) within the aqueous dispersion indicates the volume average particle size of the crosslinked ethylene/α-olefin copolymer (H) can be confirmed by image analysis using an electron microscope.

<Vinyl-Based Monomer Component (m4)>

The vinyl-based monomer component (m4) contains, as a monomer, at least one monomer selected from the group consisting of aromatic vinyl compounds, vinyl cyanide compounds, and other vinyl-based monomers.

The vinyl-based monomer component (m4) preferably contains an aromatic vinyl compound and a vinyl cyanide compound.

Examples of the aromatic vinyl compound include styrene, α-methylstyrene, o-, m- or p-methylstyrene, vinylxylene, p-t-butylstyrene and ethylstyrene. In terms of the fluidity of the thermoplastic resin composition, and the coloration and impact resistance of the molded article, styrene and α-methylstyrene are preferred. A single aromatic vinyl compound may be used alone, or a combination of two or more compounds may be used.

Examples of the vinyl cyanide compound include acrylonitrile and methacrylonitrile. A single vinyl cyanide compound may be used alone, or a combination of two or more compounds may be used.

Examples of the other vinyl-based monomers include acrylate esters (such as methyl acrylate, ethyl acrylate, propyl acrylate and butyl acrylate), methacrylate esters (such as methyl methacrylate, ethyl methacrylate, propyl methacrylate and butyl methacrylate), and maleimide-based compounds (such as N-cyclohexylmaleimide and N-phenylmaleimide). These other vinyl-based monomers may be used individually, or a combination of two or more vinyl-based monomers may be used.

In the vinyl-based monomer component (m4), the amount of the aromatic vinyl compound relative to the total mass (100% by mass) of the vinyl-based monomer component (m4) is preferably from 60 to 85% by mass, and more preferably from 62 to 80% by mass. Provided the amount of the aromatic vinyl compound falls within this range, the coloration, impact resistance and abrasion resistance of the molded article are particularly superior.

The amount of the vinyl cyanide compound relative to the total mass (100% by mass) of the vinyl-based monomer component (m4) is preferably from 15 to 40% by mass, and more preferably from 20 to 38% by mass. Provided the amount of the vinyl cyanide compound falls within this range, the coloration and impact resistance of the molded article are particularly superior.

<Graft Copolymer (I)>

The graft copolymer (I) is obtained by polymerizing the vinyl-based monomer component (m4) in the presence of an olefin-based copolymer, and examples of the graft copolymer (I) include (α), (β), (γ) and (δ) described below.

(α) A graft copolymer obtained by polymerizing the vinyl-based monomer component (m4) in the presence of the ethylene/α-olefin copolymer (F).

(β) A graft copolymer obtained by polymerizing the vinyl-based monomer component (m4) in the presence of the olefin resin aqueous dispersion (G).

(γ) A graft copolymer obtained by polymerizing the vinyl-based monomer component (m4) in the presence of the crosslinked ethylene/α-olefin copolymer (H) obtained by subjecting the ethylene/α-olefin copolymer (F) to a crosslinking treatment.

(δ) A graft copolymer obtained by polymerizing the vinyl-based monomer component (m4) in the presence of an aqueous dispersion of the crosslinked ethylene/α-olefin copolymer (H) obtained by subjecting the olefin resin aqueous dispersion (G) to a crosslinking treatment.

The graft copolymer (I) is a structure obtained by bonding graft chains formed from the polymer of the vinyl-based monomer component (m4) to an olefin-based copolymer (such as the ethylene/α-olefin copolymer (F) or the crosslinked ethylene/α-olefin copolymer (H)), and is typically composed of a core portion formed from the particulate olefin-based copolymer and an outer layer portion formed from the polymer of the vinyl-based monomer component (m4).

The graft copolymer (I) is preferably obtained by polymerizing 20 to 50% by mass of the vinyl-based monomer component (m4) in the presence of 50 to 80% by mass of the olefin-based copolymer (provided that the combination of the olefin-based copolymer and the vinyl-based monomer component (m4) totals 100% by mass).

In other words, the graft copolymer (I) is preferably composed of 50 to 80% by mass of the olefin-based copolymer and 20 to 50% by mass of the polymer of the vinyl-based monomer component (m4) (provided that the combination of the olefin-based copolymer and the polymer of the vinyl-based monomer component (m4) totals 100% by mass).

Provided the proportion of the olefin-based polymer is from 50 to 80% by mass, the balance between the fluidity of the thermoplastic resin composition, and the physical properties of the molded article such as the impact resistance and the coloration can be further improved.

In terms of the balance between the fluidity of the thermoplastic resin composition, and the impact resistance and coloration of the molded article, the graft ratio of the graft copolymer (I) is preferably from 20 to 100% by mass.

The graft ratio of the graft copolymer (I) is the value measured using a method disclosed in the examples described below.

Examples of the method used for polymerizing the vinyl-based monomer component (m4) include conventional polymerization methods (such as emulsion polymerization methods, solution polymerization methods, suspension polymerization methods and bulk polymerization methods).

One example of a method for producing the graft copolymer (I) using an emulsion polymerization method is a method in which a mixture of the vinyl-based monomer component (m4) and an organic peroxide is added continuously to an aqueous dispersion of the olefin-based copolymer (for example, the olefin resin aqueous dispersion (G) or an aqueous dispersion of the crosslinked ethylene/α-olefin copolymer (H)).

The organic peroxide is preferably used in a redox initiator containing a combination of an organic peroxide, a transition metal and a reducing agent.

A chain transfer agent or an emulsifier or the like may be used during the polymerization according to need.

In terms of not requiring the polymerization reaction to be conducted under high-temperature conditions, avoiding degradation of the olefin-based polymer, and preventing any deterioration in the impact resistance of the molded article, a combination of an organic peroxide and a ferrous sulfate-chelating agent-reducing agent is preferred as the redox initiator.

Examples of the organic peroxide include cumene hydroperoxide, diisopropylbenzene hydroperoxide and t-butyl hydroperoxide.

A redox initiator composed of cumene hydroperoxide, ferrous sulfate, sodium pyrophosphate and dextrose is particularly preferred.

Examples of the chain transfer agent include mercaptans (such as octyl mercaptan, n- or t-dodecyl mercaptan, n-hexadecyl mercaptan, and n- or t-tetradecyl mercaptan), allyl compounds (such as allylsulfonic acid, methallylsulfonic acid, and sodium salts thereof), and α-methyl styrene dimer. In terms of ease of adjustment of the molecular weight, mercaptans are preferred. A single chain transfer agent may be used alone, or a combination of two or more chain transfer agents may be used.

The method used for adding the chain transfer agent may involve single batch addition, addition in portions, or continuous addition.

The amount added of the chain transfer agent is preferably not more than 2.0 parts by mass per 100 parts by mass of the vinyl-based monomer component (m4).

Examples of the emulsifier include anionic surfactants, non-ionic surfactants and amphoteric surfactants.

Examples of the anionic surfactants include sulfate esters of higher alcohols, alkyl benzene sulfonates, fatty acid sulfonates, phosphoric acid-based salts, fatty acid salts, and salts of amino acid derivatives.

Typical examples of the nonionic surfactants include polyethylene glycol alkyl ester-type surfactants, alkyl ether-type surfactants, and alkyl phenyl ether-type surfactants.

Examples of the amphoteric surfactants include surfactants having carboxylates, sulfates, sulfonates or phosphates as the anion moiety, and having amine salts or quaternary ammonium salts as the cation moiety.

The amount added of the emulsifier is preferably not more than 10 parts by mass per 100 parts by mass of the vinyl-based monomer component (m4).

There are no particular limitations on the emulsion polymerization conditions, and suitable polymerization conditions include reaction for 1 to 10 hours at 50 to 90° C.

The graft copolymer (I) obtained using an emulsion polymerization method is obtained in a state dispersed in water.

Examples of the method used for recovering the graft copolymer (I) from the aqueous dispersion containing the graft copolymer (I) include a precipitation method in which a precipitation agent is added to the aqueous dispersion, the mixture is heated and stirred, the precipitation agent is then removed, and the precipitated graft copolymer (I) is washed with water, dewatered, and then dried.

Examples of the precipitation agent include aqueous solutions of sulfuric acid, acetic acid, calcium chloride or magnesium sulfate. A single precipitation agent may be used alone, or a combination of two or more precipitation agents may be used.

An antioxidant may also be added to the aqueous dispersion containing the graft copolymer (I) if required.

One example of a method for producing the graft copolymer (I) using a solution polymerization method is a method in which a polymerization initiator and the vinyl-based monomer component (m4) are added to a solution prepared by dissolving the olefin-based copolymer (for example, the ethylene/α-olefin copolymer (F) or the crosslinked ethylene/α-olefin copolymer (H)) in a solvent.

Examples of solvents that may be used include the types of inactive polymerization solvents typically used in radical polymerizations, and specific examples include aromatic hydrocarbons such as ethylbenzene and toluene, ketones such as methyl ethyl ketone and acetone, and halogenated hydrocarbons such as dichloromethane and carbon tetrachloride.

Typical initiators may be used as the polymerization initiator in the solution polymerization, and examples include organic peroxides such as ketone peroxides, diallyl peroxide, diacyl peroxides, peroxy esters and hydroperoxides. Further, examples of the method used for adding the polymerization initiator include methods which employ single batch addition and methods in which addition is performed continuously.

There are no particular limitations on the solution polymerization conditions, and suitable polymerization conditions include reaction for 1 to 10 hours at 50 to 90° C.

<Other Thermoplastic Resins>

Examples of other thermoplastic resins include (meth)acrylate ester resins other than the (meth)acrylate ester resin (C), polycarbonate, polybutylene terephthalate (PBT), polyethylene terephthalate (PET), polyvinyl chloride, polystyrene, polyacetal, modified polyphenylene ether (modified PPE), ethylene-vinyl acetate copolymers, polyarylate, liquid crystal polyester, polyethylene, polypropylene, polyamide (nylon) and fluororesins. These resins may be used individually, or a combination of two or more resins may be used.

<Various Additives>

Examples of various additives that may be used include antioxidants, ultraviolet absorbers, lubricants, plasticizers, stabilizers, release agents, antistatic agents, processing aids, colorants (such as pigments and dyes), fillers such as carbon fiber, glass fiber, wollastonite, calcium carbonate and silica, drip prevention agents, antibacterial agents, fungicides, coupling agents and paraffin oil. Any one of these additives may be used alone, or combinations of two or more additives may be used.

<Amount of Each Component>

The amount of the graft copolymer (B), relative to a value of 100% by mass for the combination of the graft copolymer (B), the (meth)acrylate ester resin (C), the styrene-based resin (E) and the graft copolymer (I), is preferably from 18 to 80% by mass, and more preferably from 30 to 60% by mass. Provided the amount of the graft copolymer (B) falls within this range, the balance between the scratch resistance, impact resistance, heat resistance and abrasion resistance persistence of the molded article is particularly superior.

The amount of the (meth)acrylate ester resin (C), relative to a value of 100% by mass for the combination of the graft copolymer (B), the (meth)acrylate ester resin (C), the styrene-based resin (E) and the graft copolymer (I), is preferably from 20 to 82% by mass, and more preferably from 40 to 70% by mass. Provided the amount of the (meth)acrylate ester resin (C) falls within this range, the balance between the coloration, heat resistance and heat aging resistance of the molded article is particularly superior.

The amount of the silicone oil (D) is preferably from 0.1 to 5 parts by mass, and more preferably from 0.3 to 3 parts by mass, per 100 parts by mass of the combination of the graft copolymer (B), the (meth)acrylate ester resin (C), the styrene-based resin (E) and the graft copolymer (I). Provided the amount of the silicone oil (D) falls within the above range, the scratch resistance, impact resistance, coloration and heat aging resistance of the molded article are particularly superior.

The amount of the styrene-based resin (E), relative to a value of 100% by mass for the combination of the graft copolymer (B), the (meth)acrylate ester resin (C), the styrene-based resin (E) and the graft copolymer (I), is preferably from 0 to 40% by mass, and more preferably from 1 to 40% by mass. Provided the amount of the styrene-based resin (E) falls within this range, the balance between the fluidity of the thermoplastic resin composition, and the impact resistance, coloration, weather resistance and heat aging resistance of the molded article is excellent.

An amount of 0% by mass for the styrene-based resin (E) indicates that the thermoplastic resin composition does not contain the styrene-based resin (E).

The amount of the graft copolymer (I), relative to a value of 100% by mass for the combination of the graft copolymer (B), the (meth)acrylate ester resin (C), the styrene-based resin (E) and the graft copolymer (I), is preferably from 0 to 10% by mass, and more preferably from 1.0 to 10% by mass. Provided the amount of the graft copolymer (I) falls within this range, the balance between the fluidity of the thermoplastic resin composition, and the physical properties of the molded article such as the scratch resistance, impact resistance, coloration, heat resistance and heat aging resistance of the molded article is excellent, and the abrasion resistance persistence is also excellent.

An amount of 0% by mass for the graft copolymer (I) indicates that the thermoplastic resin composition does not contain the graft copolymer (I).

Relative to the combined total (100% by mass) of the composite rubber polymer (A) and the olefin-based copolymer within the graft copolymer (I), the proportion of the olefin-based copolymer (the ethylene/α-olefin copolymer (F), the ethylene/α-olefin copolymer (F) within the olefin resin aqueous dispersion (G), or the crosslinked ethylene/α-olefin copolymer (H)) is preferably from 1 to 15% by mass, and more preferably from 4 to 12% by mass. In other words, relative to the combined total (100% by mass) of the above olefin-based copolymer and the composite rubber polymer (A), the proportion of the composite rubber polymer (A) is preferably from 85 to 99% by mass, and more preferably from 88 to 96% by mass. Provided the proportion of the olefin-based copolymer is at least 1% by mass (and the proportion of the composite rubber polymer (A) is not more than 99% by mass), the impact resistance and abrasion resistance persistence of the molded article are particularly superior. Provided the proportion of the olefin-based copolymer is not more than 15% by mass (and the proportion of the composite rubber polymer (A) is at least 85% by mass), the coloration, abrasion resistance, heat aging resistance and weather resistance of the molded article are particularly superior.

The total amount of the composite rubber polymer (A) and the olefin-based copolymer within the graft copolymer (I) (namely, the rubber content) is preferably from 5 to 30% by mass, and more preferably from 10 to 25% by mass, relative to 100% by mass of the thermoplastic resin composition. Provided the rubber content falls within this range, the fluidity of the thermoplastic resin composition and the impact resistance, scratch resistance, coloration and heat resistance of the molded article are particularly superior.

The total amount of the graft copolymer (B) and the graft copolymer (I) is preferably from 18 to 60% by mass relative to a total of 100% by mass for the combination of the graft copolymer (B), the (meth)acrylate ester resin (C), the styrene-based resin (E) and the graft copolymer (I). Provided the total amount of the graft copolymer (B) and the graft copolymer (I) falls within this range, the balance between the fluidity of the thermoplastic resin composition, and the physical properties of the molded article such as the scratch resistance, impact resistance, coloration and heat resistance is particularly superior.

The amount of the graft copolymer (B), relative to the total mass of the thermoplastic resin composition, is preferably from 18 to 80% by mass, and more preferably from 30 to 60% by mass. Provided the amount of the graft copolymer (B) falls within this range, the balance between the scratch resistance, impact resistance, heat resistance and abrasion resistance persistence of the molded article is particularly superior.

The amount of the (meth)acrylate ester resin (C), relative to the total mass of the thermoplastic resin composition, is preferably from 20 to 82% by mass, and more preferably from 40 to 70% by mass. Provided the amount of the (meth)acrylate ester resin (C) falls within this range, the balance between the coloration, heat resistance and heat aging resistance of the molded article is particularly superior.

One example of a preferred embodiment of the thermoplastic resin composition of the present invention contains the graft copolymer (B) and the (meth)acrylate ester resin (C), wherein relative to the total mass of the graft copolymer (B) and the (meth)acrylate ester resin (C), the amount of the graft copolymer (B) is from 18 to 80% by mass, and the amount of the (meth)acrylate ester resin (C) is from 20 to 82% by mass.

In this embodiment, it is preferable that the amount of the graft copolymer (B) is from 30 to 60% by mass, and the amount of the (meth)acrylate ester resin (C) is from 40 to 70% by mass.

In this embodiment, it is preferable that relative to the total mass of the thermoplastic resin composition, the total amount of the graft copolymer (B) and the (meth)acrylate ester resin (C) is from 50 to 100% by mass.

Another preferred embodiment of the thermoplastic resin composition of the present invention contains the graft copolymer (B), the (meth)acrylate ester resin (C) and the silicone oil (D), wherein relative to the total mass of the graft copolymer (B) and the (meth)acrylate ester resin (C), the amount of the graft copolymer (B) is from 18 to 80% by mass, and the amount of the (meth)acrylate ester resin (C) is from 20 to 82% by mass, and the amount of the silicone oil (D) is from 0.1 to 5 parts by mass per 100 parts by mass of the total of the graft copolymer (B) and the (meth)acrylate ester resin (C).

In this embodiment, it is preferable that the amount of the graft copolymer (B) is from 30 to 60% by mass, the amount of the (meth)acrylate ester resin (C) is from 40 to 70% by mass, and the amount of the silicone oil (D) is from 0.3 to 3 parts by mass.

In this embodiment, it is preferable that relative to the total mass of the thermoplastic resin composition, the total amount of the graft copolymer (B), the (meth)acrylate ester resin (C) and the silicone oil (D) is from 50 to 100% by mass.

Another preferred embodiment of the thermoplastic resin composition of the present invention contains the graft copolymer (B), the (meth)acrylate ester resin (C), the silicone oil (D) and the styrene-based resin (E), wherein relative to the total mass of the graft copolymer (B), the (meth)acrylate ester resin (C) and the styrene-based resin (E), the amount of the graft copolymer (B) is from 18 to 60% by mass, the amount of the (meth)acrylate ester resin (C) is from 20 to 81% by mass, and the amount of the styrene-based resin (E) is from 1 to 40% by mass, and the amount of the silicone oil (D) is from 0.1 to 5 parts by mass per 100 parts by mass of the combination of the graft copolymer (B), the (meth)acrylate ester resin (C) and the styrene-based resin (E).

In this embodiment, it is preferable that the amount of the graft copolymer (B) is from 30 to 60% by mass, the amount of the (meth)acrylate ester resin (C) is from 20 to 69% by mass, the amount of the styrene-based resin (E) is from 1 to 30% by mass, and the amount of the silicone oil (D) is from 0.3 to 3 parts by mass.

In this embodiment, it is preferable that relative to the total mass of the thermoplastic resin composition, the total amount of the graft copolymer (B), the (meth)acrylate ester resin (C), the silicone oil (D) and the styrene-based resin (E) is from 70 to 100% by mass.

Another preferred embodiment of the thermoplastic resin composition of the present invention contains the graft copolymer (B), the (meth)acrylate ester resin (C) and the graft copolymer (I), wherein relative to the total mass of the graft copolymer (B), the (meth)acrylate ester resin (C) and the graft copolymer (I), the amount of the graft copolymer (B) is from 18 to 60% by mass, the amount of the (meth)acrylate ester resin (C) is from 30 to 81% by mass, and the amount of the graft copolymer (I) is from 1 to 10% by mass.

In this embodiment, it is preferable that the amount of the graft copolymer (B) is from 30 to 60% by mass, the amount of the (meth)acrylate ester resin (C) is from 30 to 69% by mass, and the amount of the graft copolymer (I) is from 1 to 10% by mass.

In this embodiment, it is preferable that relative to the total mass of the thermoplastic resin composition, the total amount of the graft copolymer (B), the (meth)acrylate ester resin (C) and the graft copolymer (I) is from 50 to 100% by mass.

Another preferred embodiment of the thermoplastic resin composition of the present invention contains the graft copolymer (B), the (meth)acrylate ester resin (C), the silicone oil (D) and the graft copolymer (I), wherein relative to the total mass of the graft copolymer (B), the (meth)acrylate ester resin (C) and the graft copolymer (I), the amount of the graft copolymer (B) is from 18 to 60% by mass, the amount of the (meth)acrylate ester resin (C) is from 30 to 81% by mass, and the amount of the graft copolymer (I) is from 1 to 10% by mass, and the amount of the silicone oil (D) is from 0.1 to 5 parts by mass per 100 parts by mass of the combination of the graft copolymer (B), the (meth)acrylate ester resin (C) and the graft copolymer (I).

In this embodiment, it is preferable that the amount of the graft copolymer (B) is from 30 to 60% by mass, the amount of the (meth)acrylate ester resin (C) is from 30 to 69% by mass, the amount of the graft copolymer (I) is from 1 to 10% by mass, and the amount of the silicone oil (D) is from 0.3 to 3 parts by mass.

In this embodiment, it is preferable that relative to the total mass of the thermoplastic resin composition, the total amount of the graft copolymer (B), the (meth)acrylate ester resin (C), the silicone oil (D) and the graft copolymer (I) is from 50 to 100% by mass.

Another preferred embodiment of the thermoplastic resin composition of the present invention contains the graft copolymer (B), the (meth)acrylate ester resin (C), the silicone oil (D), the styrene-based resin (E) and the graft copolymer (I), wherein relative to the total mass of the graft copolymer (B), the (meth)acrylate ester resin (C), the styrene-based resin (E) and the graft copolymer (I), the amount of the graft copolymer (B) is from 18 to 60% by mass, the amount of the (meth)acrylate ester resin (C) is from 20 to 80% by mass, the amount of the styrene-based resin (E) is from 1 to 40% by mass, and the amount of the graft copolymer (I) is from 1 to 10% by mass, and the amount of the silicone oil (D) is from 0.1 to 5 parts by mass per 100 parts by mass of the combination of the graft copolymer (B), the (meth)acrylate ester resin (C), the styrene-based resin (E) and the graft copolymer (I).

In this embodiment, it is preferable that the amount of the graft copolymer (B) is from 30 to 60% by mass, the amount of the (meth)acrylate ester resin (C) is from 40 to 68% by mass, the amount of the styrene-based resin (E) is from 1 to 40% by mass, the amount of the graft copolymer (I) is from 1 to 10% by mass, and the amount of the silicone oil (D) is from 0.3 to 3 parts by mass.

In this embodiment, it is preferable that relative to the total mass of the thermoplastic resin composition, the total amount of the graft copolymer (B), the (meth)acrylate ester resin (C), the silicone oil (D), the styrene-based resin (E) and the graft copolymer (I) is from 90 to 100% by mass.

<Method for Producing Thermoplastic Resin Composition>

The thermoplastic resin composition can be obtained by mixing the graft copolymer (B), the (meth)acrylate ester resin (C), and if necessary other components (such as the silicone oil (D), the styrene-based resin (E), the graft copolymer (I), other thermoplastic resins, and various additives).

<Actions and Effects>

The thermoplastic resin composition of the present invention described above contains the graft copolymer (B) obtained by polymerizing the vinyl-based monomer component (m1) containing an aromatic vinyl compound and a vinyl cyanide compound in the presence of the composite rubber polymer (A) formed from the polyorganosiloxane (Aa), and the poly(meth)acrylate ester (Ab) having units derived from a (meth)acrylate ester and either one of, or both, units derived from a crosslinking agent and units derived from a graft-linking agent, and the (meth)acrylate ester resin (C) obtained by polymerizing the vinyl-based monomer component (m2) containing a (meth)acrylate ester, a maleimide-based compound and an aromatic vinyl compound, wherein the amount of the polyorganosiloxane (Aa) relative to the total mass (100% by mass) of the composite rubber polymer (A) is from 1 to 20% by mass, the volume average particle size of the composite rubber polymer (A) is from 0.05 to 0.15 μm, and relative to the total mass (100% by mass) of the vinyl-based monomer component (m2), the amount of the maleimide-based compound is from 1 to 30% by mass and the amount of the aromatic vinyl compound is from 5.5 to 15% by mass, and as a result, the thermoplastic resin composition has favorable fluidity, and is capable of forming a molded article having excellent scratch resistance, impact resistance, coloration, heat resistance, weather resistance or heat aging resistance. A molded article having all the properties of excellent scratch resistance, impact resistance, coloration, heat resistance, weather resistance and heat aging resistance can also be obtained.

The Charpy impact strength of a molded article (Ma1) formed from the thermoplastic resin composition of the present invention is preferably at least 5 kJ/m$^2$, and is more preferably from 5 to 20 kJ/m$^2$. Provided the Charpy impact strength is at least as high as the above lower limit, the impact resistance is excellent, and provided the Charpy impact strength is not more than the upper limit, the balance between the other properties is favorable.

The "molded article (Ma1)" is a molded article having a length of 80 mm, a width of 10 mm and a thickness of 4 mm obtained by melt-kneading the thermoplastic resin composition in a twin screw extruder, and then performing molding in an injection molding machine under conditions including a cylinder temperature of 200 to 270° C. and a mold temperature of 60° C.

The "Charpy impact strength" is the value obtained by subjecting the molded article (Ma1) to a Charpy impact strength test in accordance with ISO 179-1:2000, under conditions including a temperature of 23° C. and a notched molded article.

The temperature of deflection under load for the molded article (Ma1) formed from the thermoplastic resin composition of the present invention is preferably at least 80° C., and more preferably from 80 to 115° C. Provided the temperature of deflection under load is at least as high as the above lower limit, the heat resistance is excellent, and provided the temperature of deflection under load is not more than the upper limit, the balance between the other properties is favorable.

The "temperature of deflection under load" is the value obtained by subjecting the molded article (Ma1) to measurement in accordance with ISO 75-1:2004 using a flatwise method at 1.83 MPa and 4 mm.

The lightness L* of a molded article (Ma2) formed from the thermoplastic resin composition of the present invention is preferably not more than 7.0, and more preferably from 3.0 to 7.0. Provided the lightness L* is not more than the above upper limit, the coloration is excellent, whereas provided the lightness L* is at least as large as the above lower limit, the balance between the other properties is favorable.

The "molded article (Ma2)" is a molded article having a length of 100 mm, a width of 100 mm and a thickness of 3 mm obtained by melt-kneading, in a twin screw extruder, the thermoplastic resin composition in a state containing 0.8 parts of carbon black per 100 parts of the combined resin fraction (the graft copolymer (B), the (meth)acrylate ester resin (C), the styrene-based resin (E), the graft copolymer (I), and any other thermoplastic resins), and then performing molding in an injection molding machine under conditions including a cylinder temperature of 200 to 270° C. and a mold temperature of 60° C.

The "lightness L*" of the molded article (Ma2) is measured using the SCE method. A more detailed description of the method for measuring the lightness (L*) by the SCE method is included in the examples described below.

The degree of color change (ΔE) following subjecting a molded article (Ma2) formed from the thermoplastic resin composition of the present invention to a weather resistance test is preferably not more than 3.0, and more preferably from 1.0 to 3.0. Provided the abovementioned ΔE is not more than the above upper limit, the weather resistance is excellent, whereas provided the ΔE is at least as large as the above lower limit, then the balance between the other properties is favorable.

The "weather resistance test" is a test performed by treating the molded article (Ma2) for 1,000 hours using a Sunshine Weather Meter under conditions including a black panel temperature of 63° C. and a cycle time of 60 minutes (including 12 minutes of rain).

The "degree of color change (ΔE)" is a value measured by the SCE method using a spectral colorimeter.

The degree of color change (ΔE) following subjecting a molded article (Ma2) formed from the thermoplastic resin composition of the present invention to a heat aging resistance test is preferably not more than 3.4, and more preferably from 0.5 to 3.4. Provided the abovementioned ΔE is not more than the above upper limit, the heat aging resistance is excellent, and if ΔE is at least as large as the above lower limit, then the balance between the other properties is favorable.

The "heat aging resistance test" is a test performed by treating the molded article (Ma2) for 500 hours using a thermostatic chamber under conditions including a temperature of 90° C. and a humidity of 30%. The degree of color change (ΔE) is as described above.

The absolute value of the difference in the lightness L*(mb−ma) following subjecting a molded article (Ma2) formed from the thermoplastic resin composition of the present invention to a pencil hardness test is preferably less than 3.0, and more preferably at least 1.0 but less than 3.0. Provided the absolute value of L*(mb−ma) is not more than the above upper limit, the scratching resistance is excellent, whereas provided the absolute value of L*(mb−ma) is at least as large as the above lower limit, the balance between the other properties is favorable.

The value of L*(mb−ma) is calculated from the following equation (3).

$$\Delta L^*(mb-ma)=L^*(mb)-L^*(ma) \quad (3)$$

L*(ma) is the lightness L* of the molded article (Ma2). L*(mb) is the lightness L* of a molded article (Mb). The lightness L* is as defined above.

The "molded article (Mb)" is prepared by using a pencil hardness tester to press a pencil having a hardness of 3H against the surface of the molded article (Ma2) with a load of 7.35 N (750 g), and then moving the molded article (Ma2) about 5 cm in this loaded state, thereby scratching the surface of the molded article (Ma2) with the pencil.

The absolute value of the difference in the lightness L*(mc−ma) following subjecting a molded article (Ma2) formed from the thermoplastic resin composition of the present invention to an abrasion test is preferably less than 3.0, and more preferably at least 1.0 but less than 3.0. Provided the absolute value of L*(mc−ma) is not more than the above upper limit, the scratching resistance is excellent, whereas provided the absolute value of L*(mc–ma) is at least as large as the above lower limit, the balance between the other properties is favorable.

The value of L*(mc–ma) is calculated from the following equation (4).

$$\Delta L^*(mc-ma) = L^*(mc) - L^*(ma) \quad (4)$$

L*(mc) is the lightness L* of a molded article (Mc). L*(ma) and the method used for measuring the lightness are as described above.

The "molded article (Mc)" is formed by preparing a rod-shaped jig having a tip portion formed in a hemispherical shape, covering the tip portion with a laminated sheet having 16 layers of laminated tissue paper, bringing the tip portion covered with the laminated sheet into contact with the surface of the molded article (Ma2) for which L*(ma) has been measured so that the rod-shaped jig is orthogonal to the surface of the molded article, and then sliding the tip portion 100 times back and forth across the surface of the molded article (Ma2) in a horizontal direction, thereby scratching the molded article (Ma2). The load applied during the abrasion process is 9.8 N (1 kg).

The absolute value of the difference in the lightness L*(me–md) following subjecting a molded article (Mk1), formed from the thermoplastic resin composition of the present invention and then subjected to a heat treatment, to an abrasion test is preferably less than 3.0, and more preferably at least 0.5 but less than 3.0. Provided the absolute value of L*(me–md) is not more than the above upper limit, the scratching resistance is excellent, whereas provided the absolute value of L*(me–md) is at least as large as the above lower limit, the balance between the other properties is favorable.

The "molded article (Mk1)" is prepared by subjecting the molded article (Ma2) to treatment for 500 hours in a thermostatic chamber under conditions including a temperature of 90° C. and a humidity of 30%.

The value of L*(me–md) is calculated from the following equation (5).

$$\Delta L^*(me-md) = L^*(me) - L^*(md) \quad (5)$$

L*(md) is the lightness L* of a molded article (Mk2). L*(e) is the lightness L* of a molded article (Me). The method used for measuring the lightness is as described above.

The "molded article (Mk2)" is obtained by washing the molded article (Mk1) using a neutral surfactant.

The "molded article (Me)" is formed by preparing a rod-shaped jig having a tip portion formed in a hemispherical shape, covering the tip portion with a laminated sheet having 16 layers of laminated tissue paper, bringing the tip portion covered with the laminated sheet into contact with the surface of the molded article (Mk2) for which L*(md) has been measured so that the rod-shaped jig is orthogonal to the surface of the molded article, and then sliding the tip portion 100 times back and forth across the surface of the molded article (Mk2) in a horizontal direction, thereby scratching the molded article (Mk2). The load applied during the abrasion process is 9.8 N (1 kg).

The difference Δ(ΔL*) between the difference in the lightness ΔL*(mc–ma) following subjecting a molded article (Ma2) formed from the thermoplastic resin composition of the present invention to an abrasion test, and the difference in the lightness ΔL*(me–md) following subjecting a molded article (Mk1), formed from the thermoplastic resin composition of the present invention and then subjected to a heat treatment, to an abrasion test is preferably from 0.0 to 2.0, and more preferably from 0.0 to 1.7. Provided the value of Δ(ΔL*) is not more than the above upper limit, the abrasion resistance persistence is excellent.

The value of Δ(ΔL*) is calculated from the following equation (6).

$$\Delta(\Delta L^*) = \Delta L^*(me-md) - \Delta L^*(mc-ma) \quad (6)$$

ΔL*(mc–ma) and ΔL*(me–md) are the same as defined above.

"Molded Article"

A molded article of the present invention is obtained by molding processing of the thermoplastic resin composition of the present invention using a conventional molding method.

Examples of the molding method include injection molding methods, press molding methods, extrusion molding methods, vacuum molding methods, and blow molding methods.

Examples of potential applications for the molded article include interior and exterior componentry for vehicles, office equipment, household electronics, and building materials and the like.

Because the molded article of the present invention described above uses the thermoplastic resin composition of the present invention, the molded article exhibits excellent scratch resistance, impact resistance, coloration, heat resistance, weather resistance or heat aging resistance.

EXAMPLES

Specific examples of the invention are presented below. However, the present invention is in no way limited by these examples.

In the following description, "%" means "% by mass", and "parts" means "parts by mass".

The various measurement and evaluation methods used in the following examples and comparative examples are described below.

<Measurement Method for Average Particle Size>

The volume average particle size (μm) was measured using a microtrac (Nanotrac 150, manufactured by Nikkiso Co., Ltd.), using pure water as the measurement solvent.

<Measurement Method for Weight-Average Molecular Weight of (meth)acrylate ester Resin (C) and styrene-Based Resin (E)>

The polystyrene-equivalent weight-average molecular weight (Mw) was measured using a GPC apparatus (GPC: HLC8220, manufactured by Tosoh Corporation, column: TSK Gel Super HZM-H, manufactured by Tosoh Corporation), using tetrahydrofuran (THF: 40° C.) as the solvent.

<Measurement Method for Weight-Average Molecular Weight (Mw) and Molecular Weight Distribution (Mw/Mn) of ethylene/α-olefin Copolymer (F)>

The polystyrene-equivalent weight-average molecular weight (Mw) and the number-average molecular weight (Mn) were measured using a GPC apparatus (GPC: GPC/V2000, manufactured by Waters Corporation, Columns: Shodex AT-G+AT-806MS, manufactured by Showa Denko K.K.), using o-dichlorobenzene (145° C.) as the solvent, and the molecular weight distribution (Mw/Mn) was then calculated.

<Measurement Method for Gel Content Ratio of Crosslinked Ethylene/α-Olefin Copolymer (H)>

An aqueous or solvent dispersion of the crosslinked ethylene/α-olefin copolymer (H) was coagulated in dilute sulfuric acid, and the resulting coagulated substance was washed with water and dried to obtain a coagulated powder sample [h1]. Subsequently, 0.5 g of this coagulated powder sample [h1] was immersed in 200 mL of toluene at 110° C. for 5 hours and then filtered through a 200-mesh metal gauze, the resulting residue was then dried, the mass of the dried substance [h2] was measured, and the gel content ratio of the crosslinked ethylene/α-olefin copolymer (H) was calculated from the following equation (1).

$$\text{Gel content ratio(\%)} = \text{mass of dried substance }[h2] (g)/\text{mass of coagulated powder sample }[h1](g) \times 100 \quad (1)$$

<Measurement Method for Graft Ratio of Graft Copolymer (I)>

First, 1 g of the graft copolymer (I) was added to 80 mL of acetone and heated under reflux for 3 hours at a temperature of 65 to 70° C., and the thus obtained suspended acetone solution was then centrifuged using a centrifuge (CR21E, manufactured by Hitachi Koki Co., Ltd.) at 14,000 rpm for 30 minutes, thereby fractionating the suspended solution into a precipitated component (acetone-insoluble component) and an acetone solution (acetone-soluble component). The precipitated component (acetone-insoluble component) was dried and the mass (Y(g)) was measured, and the graft ratio was then calculated from the following equation (2). In equation (2), Y represents the mass (g) of the acetone-insoluble component of the graft copolymer (I), X represents the total mass (g) of the graft copolymer (I) used in determining Y, and the rubber ratio represents the amount of olefin-based copolymer solid fraction in the graft copolymer (I).

$$\text{Graft ratio(\%)} = \{(Y - X \times \text{rubber ratio})/X \times \text{rubber ratio}\} \times 100 \quad (2)$$

<Melt-Kneading 1>

A mixture prepared by mixing the graft copolymer (B) and the (meth)acrylate ester resin (C) and the like in accordance with the blend formulation shown for each of the examples and comparative examples was subjected to melt-kneading using a twin-screw extruder (PCM30, manufactured by Ikegai Inc.) fitted with a vacuum vent of 30 mmø, under conditions including a cylinder temperature of 200 to 260° C. and a vacuum of 93.325 kPa, thus obtaining a thermoplastic resin composition (1). After melt-kneading, pelletization was performed using a pelletizer (SH-type pelletizer, manufactured by Souken Co., Ltd.).

<Melt-Kneading 2>

A mixture prepared by mixing the graft copolymer (B) and the (meth)acrylate ester resin (C) and the like in accordance with the blend formulation shown for each of the examples and comparative examples, and 0.8 parts of a carbon black (4966, manufactured by Mitsubishi Chemical Corporation) per 100 parts of the total amount of resin components within the above mixture were mixed together and then subjected to melt-kneading using a twin-screw extruder (PCM30, manufactured by Ikegai Inc.) fitted with a vacuum vent of 30 mmø, under conditions including a cylinder temperature of 200 to 260° C. and a vacuum of 93.325 kPa, thus obtaining a thermoplastic resin composition (2). After melt-kneading, pelletization was performed using a pelletizer (SH-type pelletizer, manufactured by Souken Co., Ltd.).

<Measurement of Melt Volume Rate (MVR)>

The MVR of the thermoplastic resin composition (1) at 230° C. was measured in accordance with ISO 1133:1997 under a load of 98 N (10 kg). The MVR is an indication of the fluidity of the thermoplastic resin composition.

<Injection Molding 1>

Using the pellets of the thermoplastic resin composition (1) obtained by melt-kneading, a molded article having a length of 80 mm, a width of 10 mm and a thickness of 4 mm was molded using an injection molding machine (IS55FP-1.5A, manufactured by Toshiba Machine Co., Ltd.) under conditions including a cylinder temperature of 200 to 270° C. and a mold temperature of 60° C., and this molded article was used as the molded article for evaluating the Charpy impact strength and as the molded article for evaluating the temperature of deflection under load (namely, the molded article (Ma1)).

<Injection Molding 2>

Using the pellets of the thermoplastic resin composition (2) obtained by melt-kneading, a molded article having a length of 100 mm, a width of 100 mm and a thickness of 3 mm was molded using an injection molding machine (IS55FP-1.5A, manufactured by Toshiba Machine Co., Ltd.) under conditions including a cylinder temperature of 200 to 270° C. and a mold temperature of 60° C., and this molded article was used as the molded article for evaluating the coloration, the molded article for evaluating the weather resistance, the molded article for evaluating the heal aging resistance, and the molded article for evaluating the scratch resistance (namely, the molded article (Ma2)).

<Evaluation of Impact Resistance: Charpy Impact Test>

The molded article (Ma1) was subjected to a Charpy impact test (notched) in accordance with ISO 179-1:2000, under conditions including a temperature of 23° C., thus measuring the Charpy impact strength.

<Evaluation of Heat Resistance>

The temperature (° C.) of deflection under load for the molded article (Ma1) was measured in accordance with ISO 75-1:2004, using the flatwise method at 1.83 MPa and 4 mm.

(Evaluation of Coloration)

The lightness L* of the molded article (Ma2) was measured by the SCE method using a spectral colorimeter (CM-3500d, manufactured by Konica Minolta Optics, Inc.). The value of L* measured in this manner is designated "L*(ma)". As the value of L* decreases, the molded article becomes blacker, indicating more favorable coloration.

In the present description, the lightness (L*) means the value (L*) for the lightness among the color values in the L*a*b* color space employed in JIS Z 8729:2004.

The SCE method means a method for measuring color using a spectral colorimeter by removing the light due to regular reflection using a light trap in accordance with JIS Z 8722:2009.

<Evaluation of Weather Resistance>

The molded article (Ma2) was treated for 1,000 hours using a Sunshine Weather Meter (manufactured by Suga Test Instruments Co., Ltd.) under conditions including a black panel temperature of 63° C. and a cycle time of 60 minutes (including 12 minutes of rain). The weather resistance was then evaluated by the SCE method using a spectral colorimeter to measure the degree of color change (ΔE) upon performing the treatment. A smaller ΔE value indicates better weather resistance.

<Evaluation of Heat Aging Resistance>

The molded article (Ma2) was treated for 500 hours using a thermostatic chamber (manufactured by Espec Corporation) under conditions including a temperature of 90° C. and a humidity of 30%. The heat aging resistance was then evaluated by the SCE method using a spectral colorimeter to measure the degree of color change (ΔE) upon performing the treatment. A smaller ΔE value indicates better heat aging resistance.

<Evaluation of Scratching Resistance>

Using a pencil hardness tester, a pencil having a hardness of 3H was pressed against the surface of the molded article (Ma2) with a load of 7.35 N (750 g), and the molded article (Ma2) was then moved about 5 cm in this loaded state, thereby scratching the surface of the molded article (Ma2) with the pencil to form a scratch on the molded article (Ma2).

The lightness L* of the surface of the scratched molded article (Mb) was measured by the SCE method using a spectral colorimeter. The value of L* measured in this manner is designated "L*(mb)".

(Determination of Scratching Resistance)

The value of $\Delta L^*(mb-ma)$ used as an indicator for determining the noticeability of the scratch on the molded article (Mb) was calculated from the equation (3) below. A larger absolute value for $\Delta L^*(mb-ma)$ indicates a more noticeable scratch.

$$\Delta L^*(mb-ma) = L^*(mb) - L^*(ma) \quad (3)$$

When the absolute value of $\Delta L^*(mb-ma)$ is 3.0 or less, the scratch is not noticeable and the aesthetic appearance of the molded article is not impaired.

When the absolute value of $\Delta L^*(mb-ma)$ is greater than 3.0 but not more than 7.0, the scratch is not easily noticeable, and the aesthetic appearance of the molded article is not impaired.

When the absolute value of $\Delta L^*(mb-ma)$ is greater than 7.0, the scratch is easily noticeable, and the aesthetic appearance of the molded article is impaired.

<Evaluation of Abrasion Resistance 1>

As illustrated in the FIGURE, a rod-shaped jig 10 having a tip portion 11 formed in a hemispherical shape was prepared, and the tip portion 11 was covered with a laminated sheet 12 having 16 layers of laminated tissue paper (Elleair, manufactured by Daio Paper Corporation). The tip portion 11 covered with the laminated sheet 12 was then brought into contact with the surface of the molded article (Ma2) 13 so that the rod-shaped jig 10 was orthogonal to the surface of the molded article (Ma2) 13, and the tip portion 11 was then slid 100 times back and forth across the surface of the molded article (Ma2) 13 in the horizontal direction (the direction of the arrow in the FIGURE). The load applied during the abrasion process was 9.8 N (1 kg). After the 100 back and forth repetitions, the lightness L* of the surface of the scratched molded article (Mc) was measured by the SCE method using a spectral colorimeter. The value of L* measured in this manner is designated "L*(mc)".

(Determination of Abrasion Resistance)

The value of $\Delta L^*(mc-ma)$ used as an indicator for determining the noticeability of scratches on the molded article (Mc) was calculated from the equation (4) below. A larger absolute value for $\Delta L^*(mc-ma)$ indicates more noticeable scratches.

$$\Delta L^*(mc-ma) = L^*(mc) - L^*(ma) \quad (4)$$

When the absolute value of $\Delta L^*(mc-ma)$ is less than 3.0, the scratches are not noticeable and the aesthetic appearance of the molded article is not impaired.

When the absolute value of $\Delta L^*(mc-ma)$ is at least 3.0 but not more than 7.0, the scratches are not easily noticeable, and the aesthetic appearance of the molded article is not impaired.

When the absolute value of $\Delta L^*(mc-ma)$ is greater than 7.0, the scratches are easily noticeable, and the aesthetic appearance of the molded article is impaired.

<Evaluation of Abrasion Resistance 2>

The molded article (Ma2) was treated for 500 hours using a thermostatic chamber (manufactured by Espec Corporation) under conditions including a temperature of 90° C. and a humidity of 30%. The molded article (Mk1) that had been treated for 500 hours was then washed using a neutral surfactant ("Car Shampoo", a vehicle detergent manufactured by SOFT99 Corporation). The lightness L* of the surface of the washed molded article (Mk2) was measured by the SCE method using a spectral colorimeter. The value of L* measured in this manner is designated "L*(md)".

As illustrated in the FIGURE, a rod-shaped jig 10 having a tip portion 11 formed in a hemispherical shape was prepared, and the tip portion 11 was covered with a laminated sheet 12 having 16 layers of laminated tissue paper (Elleair, manufactured by Daio Paper Corporation). The tip portion 11 covered with the laminated sheet 12 was then brought into contact with the surface of the molded article (Mk2 in this case) 13 so that the rod-shaped jig 10 was orthogonal to the surface of the molded article, and the tip portion 11 was then slid 100 times back and forth across the surface of the molded article (Mk2 in this case) 13 in the horizontal direction (the direction of the arrow in the FIGURE). The load applied during the abrasion process was 9.8 N (1 kg). After the 100 back and forth repetitions, the lightness L* of the surface of the scratched molded article (Me) was measured by the SCE method using a spectral colorimeter. The value of L* measured in this manner is designated "L*(me)".

(Determination of Abrasion Resistance 2)

The value of $\Delta L^*(me-md)$ used as an indicator for determining the noticeability of scratches on the molded article (Me) was calculated from the equation (5) below. A larger absolute value for $\Delta L^*(me-md)$ indicates more noticeable scratches.

$$\Delta L^*(me-md) = L^*(me) - L^*(md) \quad (5)$$

When the absolute value of $\Delta L^*(me-md)$ is less than 3.0, the scratches are not noticeable and the aesthetic appearance of the molded article is not impaired.

When the absolute value of $\Delta L^*(me-md)$ is at least 3.0 but not more than 7.0, the scratches are not easily noticeable, and the aesthetic appearance of the molded article is not impaired.

When the absolute value of $\Delta L^*(me-md)$ is greater than 7.0, the scratches are easily noticeable, and the aesthetic appearance of the molded article is impaired.

<Determination of Abrasion Resistance Persistence>

The abrasion resistance persistence $\Delta(\Delta L^*)$ for the molded article was calculated from the equation (6) below. A larger absolute value for $\Delta(\Delta L^*)$ indicates lower abrasion resistance persistence.

$$\Delta(\Delta L^*) = \Delta L^*(me-md) - \Delta L^*(mc-ma) \quad (6)$$

<<Each of the Components>>

In the following examples, the composite rubber polymer (A), the graft copolymer (B), the (meth)acrylate ester resin (C), the silicone oil (D), the styrene-based resin (E) and the graft copolymer (I) described below were used.

<Graft Copolymer (B)>

(Production of polyorganosiloxane (Aa1))

First, 96 parts of octamethylcyclotetrasiloxane, 2 parts of γ-methacryloyloxypropyldimethoxymethylsilane and 2 parts of tetraethoxysilane were mixed together to obtain 100 parts of a siloxane-based mixture. Subsequently, 300 parts of ion-exchanged water containing 8 parts of dissolved sodium dodecylbenzenesulfonate was added to the mixture and stirred for 2 minutes at 10,000 rpm using a homomixer, and the resulting mixture was then passed once through a homogenizer at a pressure of 30 MPa, thus obtaining a stable premixed organosiloxane aqueous dispersion.

A reaction vessel fitted with a reagent injection container, a cooling tube, a jacket heater and a stirring device was charged with 2 parts of dodecylbenzenesulfonic acid and 98 parts of ion-exchanged water, thus preparing a 2% aqueous solution of dodecylbenzenesulfonic acid. With this aqueous solution heated to 85° C., the premixed organosiloxane aqueous dispersion was added to the reaction vessel in a dropwise manner over a period of 4 hours, and after completion of the dropwise addition, the temperature was maintained for 1 hour, and then cooled. The reaction liquid was left to stand for 48 hours at room temperature, and was then neutralized using a sodium hydroxide aqueous solution, thereby obtaining an aqueous dispersion of a polyorganosiloxane (Aa1).

A portion of the polyorganosiloxane (Aa1) aqueous dispersion was dried at 170° C. for 30 minutes, and determination of the solid fraction concentration revealed a value of 17.3%. The volume average particle diameter of the polyorganosiloxane (Aa1) dispersed in the aqueous dispersion was 0.034 μm.

(Production of Polyorganosiloxane (Aa2))

First, 96 parts of octamethylcyclotetrasiloxane, 2 parts of γ-methacryloyloxypropyldimethoxymethylsilane and 2 parts of tetraethoxysilane were mixed together to obtain 100 parts of a siloxane-based mixture. Subsequently, 300 parts of ion-exchanged water containing 0.67 parts of dissolved sodium dodecylbenzenesulfonate was added to the mixture and stirred for 2 minutes at 10,000 rpm using a homomixer, and the resulting mixture was then passed once through a homogenizer at a pressure of 30 MPa, thus obtaining a stable premixed organosiloxane aqueous dispersion.

A reaction vessel fitted with a reagent injection container, a cooling tube, a jacket heater and a stirring device was charged with 2 parts of dodecylbenzenesulfonic acid and 98 parts of ion-exchanged water, thus preparing a 2% aqueous solution of dodecylbenzenesulfonic acid. With this aqueous solution heated to 85° C., the premixed organosiloxane aqueous dispersion was added to the reaction vessel in a dropwise manner over a period of 4 hours, and after completion of the dropwise addition, the temperature was maintained for 1 hour, and then cooled. The reaction liquid was left to stand for 48 hours at room temperature, and was then neutralized using a sodium hydroxide aqueous solution, thereby obtaining an aqueous dispersion of a polyorganosiloxane (Aa2).

A portion of the polyorganosiloxane (Aa2) aqueous dispersion was dried at 170° C. for 30 minutes, and determination of the solid fraction concentration revealed a value of 17.3%. The volume average particle diameter of the polyorganosiloxane (Aa2) dispersed in the aqueous dispersion was 0.05 μm.

(Preparation of Composite Rubber Polymer (A-1))

A reaction vessel fitted with a reagent injection container, a cooling tube, a jacket heater and a stirring device was charged with 68.3 parts of the aqueous dispersion of the polyorganosiloxane (Aa1) and 0.94 parts of an emulsifier (sodium polyoxyethylene alkyl phenyl ether sulfate), and 203 parts of ion-exchanged water was then added and mixed. Subsequently, a mixture composed of 61.8 parts of n-butyl acrylate, 0.21 parts of allyl methacrylate, 0.11 parts of 1,3-butylene glycol dimethacrylate and 0.13 parts of tert-butyl hydroperoxide was added (mass ratio of polyorganosiloxane (Aa1)/n-butyl acrylate: 16/84). The reaction vessel was then flushed with a stream of nitrogen to replace the internal atmosphere with nitrogen, and the temperature was then raised to 60° C. Once the internal temperature of the reaction vessel had reached 60° C., an aqueous solution containing 0.0001 parts of ferrous sulfate, 0.0003 parts of disodium ethylenediaminetetraacetate and 0.24 parts of rongalit dissolved in 10 parts of ion-exchanged water was added, and a radical polymerization was started. The polymerization of the (meth)acrylate ester components resulted in the temperature rising to 78° C. This state was maintained for 1 hour to complete polymerization of the (meth)acrylate ester components, thus obtaining an aqueous dispersion of a composite rubber polymer (A-1). The volume average particle size of the composite rubber polymer (A-1) dispersed within the aqueous dispersion was 0.041 μm. The volume average particle size of the composite rubber polymer (A-1) is shown in Table 1.

(Preparation of Composite Rubber Polymer (A-2))

With the exception of altering the amount (number of parts) of the emulsifier, an aqueous dispersion of a composite rubber polymer (A-2) was obtained in the same manner as the preparation of the composite rubber polymer (A-1). The volume average particle size of the composite rubber polymer (A-2) dispersed within the aqueous dispersion is shown in Table 1.

(Preparation of Composite Rubber Polymer (A-3))

A reaction vessel fitted with a reagent injection container, a cooling tube, a jacket heater and a stirring device was charged with 68.3 parts of the aqueous dispersion of the polyorganosiloxane (Aa2) and 0.85 parts of an emulsifier (sodium polyoxyethylene alkyl phenyl ether sulfate), and 203 parts of ion-exchanged water was then added and mixed. Subsequently, a mixture composed of 61.8 parts of n-butyl acrylate, 0.21 parts of allyl methacrylate, 0.11 parts of 1,3-butylene glycol dimethacrylate and 0.13 parts of tert-butyl hydroperoxide was added (mass ratio of polyorganosiloxane (Aa2)/n-butyl acrylate: 16/84). The reaction vessel was then flushed with a stream of nitrogen to replace the internal atmosphere with nitrogen, and the temperature was then raised to 60° C. Once the internal temperature of the reaction vessel had reached 60° C., an aqueous solution containing 0.0001 parts of ferrous sulfate, 0.0003 parts of disodium ethylenediaminetetraacetate and 0.24 parts of rongalit dissolved in 10 parts of ion-exchanged water was added, and a radical polymerization was started. The polymerization of the (meth)acrylate ester components resulted in the temperature rising to 78° C. This state was maintained for 1 hour to complete polymerization of the (meth)acrylate ester components, thus obtaining an aqueous dispersion of a composite rubber polymer (A-3). The volume average particle size of the composite rubber polymer (A-3) dispersed within the aqueous dispersion was 0.071 μm. The volume average particle size of the composite rubber polymer (A-3) is shown in Table 1.

(Preparation of Composite Rubber Polymers (A-4) to (A-7))

With the exception of altering the amount (number of parts) of the emulsifier, aqueous dispersions of composite rubber polymers (A-4) to (A-7) were obtained in the same manner as the preparation of the composite rubber polymer (A-3). The volume average particle sizes of the composite rubber polymers (A-4) to (A-7) dispersed within the aqueous dispersions are shown in Table 1.

(Preparation of Composite Rubber Polymer (A-8))

A reaction vessel was charged with a mixture containing 0.7 parts of dipotassium alkenyl succinate, 175 parts of ion-exchanged water, 100 parts of n-butyl acrylate, 0.26 parts of allyl methacrylate, 0.14 parts of 1,3-butylene glycol dimethacrylate and 0.2 parts of t-butyl hydroperoxide. The reaction vessel was then flushed with a stream of nitrogen to replace the internal atmosphere with nitrogen, and the temperature was then raised to 60° C. Once the internal temperature of the reaction vessel had reached 50° C., an aqueous solution composed of 0.00026 parts of ferrous sulfate, 0.0008 parts of disodium ethylenediaminetetraacetate, 0.45 parts of rongalit and 10 parts of ion-exchanged water was added, a radical polymerization was started, and the internal temperature was raised to 75° C. This state was maintained for a further 1 hour, thus obtaining an aqueous dispersion of a composite rubber polymer (A-8). The volume average particle size of the composite rubber polymer (A-8) dispersed within the aqueous dispersion was 0.096 μm. The volume average particle size of the composite rubber polymer (A-8) is shown in Table 2.

(Preparation of Composite Rubber Polymers (A-9) to (A-13))

With the exceptions of altering the mass ratio between the polyorganosiloxane (Aa2) and the n-butyl acrylate, and altering the amount (number of parts) of the emulsifier, aqueous dispersions of composite rubber polymers (A-9) to (A-13) were obtained in the same manner as the preparation of the composite rubber polymer (A-3). The volume average particle sizes of the composite rubber polymers (A-9) to (A-13) dispersed within the aqueous dispersions are shown in Table 2.

perature was maintained for 1 hour, and then an aqueous solution containing 0.0002 parts of ferrous sulfate, 0.0006 parts of disodium ethylenediaminetetraacetate and 0.25 parts of rongalit dissolved in 10 parts of ion-exchanged water was added. Next, a mixed liquid containing 5 parts of acrylonitrile, 15 parts of styrene and 0.1 parts of tert-butyl hydroperoxide was added in a dropwise manner over a period of 40 minutes, and polymerization was conducted. Following completion of the dropwise addition, the temperature was maintained for 1 hour, and the reaction mixture was then cooled to obtain an aqueous dispersion of a graft copolymer (B-1) having an acrylonitrile-styrene copolymer grafted to the composite rubber polymer (A-1).

Subsequently, 150 parts of an aqueous solution containing 5% of dissolved calcium acetate was heated at 60° C. and stirred, and 100 parts of the aqueous dispersion of the graft copolymer (B-1) was then added gradually in a dropwise manner to this aqueous solution of calcium acetate, thereby coagulating the graft copolymer (B-1). The thus obtained coagulated product was separated, washed and dried, thus obtaining a dried powder of the graft copolymer (B-1). The proportions used of the composite rubber polymer (A-1), the styrene and the acrylonitrile are shown in Table 3.

(Preparation of Graft Copolymers (B-2) to (B-7))

With the exception of altering the type of composite rubber polymer (A) aqueous dispersion as shown in Table 3,

TABLE 1

| Composite rubber polymer (A) | A-1 | A-2 | A-3 | A-4 | A-5 | A-6 | A-7 |
|---|---|---|---|---|---|---|---|
| Polyorganosiloxane (Aa1) (% by mass) | 16 | 16 | | | | | |
| Polyorganosiloxane (Aa2) (% by mass) | | | 16 | 16 | 16 | 16 | 16 |
| n-butyl acrylate (% by mass) | 84 | 84 | 84 | 84 | 84 | 84 | 84 |
| Emulsifier (parts) | 0.94 | 0.90 | 0.85 | 0.75 | 0.72 | 0.63 | 0.57 |
| Volume average particle size (μm) | 0.041 | 0.052 | 0.071 | 0.096 | 0.120 | 0.140 | 0.160 |

TABLE 2

| Composite rubber polymer (A) | A-8 | A-9 | A-10 | A-11 | A-12 | A-13 |
|---|---|---|---|---|---|---|
| Polyorganosiloxane (Aa2) (% by mass) | 0 | 2 | 4 | 17 | 19 | 25 |
| n-butyl acrylate (% by mass) | 100 | 98 | 96 | 83 | 81 | 75 |
| Emulsifier (parts) | 0.7 | 0.76 | 0.76 | 0.76 | 0.76 | 0.76 |
| Volume average particle size (μm) | 0.096 | 0.096 | 0.096 | 0.096 | 0.096 | 0.096 |

(Preparation of Graft Copolymer (B-1))

A reaction vessel fitted with a reagent injection container, a cooling tube, a jacket heater and a stirring device was charged with the aqueous dispersion of the composite rubber polymer (A-1) (in an amount equivalent to a solid fraction of 50 parts), the liquid temperature inside the reaction vessel was raised to 60° C., and an aqueous solution containing 0.4 parts of rongalit dissolved in 10 parts of ion-exchanged water was added. Subsequently, a mixed liquid containing 7.5 parts of acrylonitrile, 22.5 parts of styrene and 0.18 parts of tert-butyl hydroperoxide was added in a dropwise manner over a period of 1 hour, thus effecting a polymerization. Following completion of the dropwise addition, the temgraft copolymers (B-2) to (B-7) were obtained in the same manner as the preparation of the graft copolymer (B-1).

(Preparation of Graft Copolymer (B-8))

A reaction vessel fitted with a reagent injection container, a cooling tube, a jacket heater and a stirring device was charged with the aqueous dispersion of the composite rubber polymer (A-8) (in an amount equivalent to a solid fraction of 50 parts), the liquid temperature inside the reaction vessel was raised to 60° C., and an aqueous solution composed of 0.15 parts of rongalit, 0.65 parts of dipotassium alkenyl succinate and 10 parts of ion-exchanged water was added. Subsequently, a mixed liquid containing 6.3 parts of acrylonitrile, 18.7 parts of styrene and 0.11 parts of tert-butyl hydroperoxide was added in a dropwise manner over a period of 1 hour, thus effecting a graft polymerization. Five minutes after completion of the dropwise addition, an aqueous solution composed of 0.001 parts of ferrous sulfate, 0.003 parts of disodium ethylenediaminetetraacetate, 0.15 parts of rongalit and 5 parts of ion-exchanged water was added, and a mixed liquid containing 6.2 parts of acrylonitrile, 18.8 parts of styrene, 0.19 parts of tert-butyl hydroperoxide and 0.014 parts of n-octyl mercaptan was then added in a dropwise manner over a period of 1 hour to effect a graft polymerization. Following completion of the dropwise addition, the internal temperature was maintained at 75° C. for 10 minutes and then cooled, and once the internal temperature had reached 60° C., an aqueous solution containing 0.2 parts of an antioxidant (Antage W500, manufactured by Yoshitomi Pharmaceutical Industries, Ltd.) and 0.2 parts of dipotassium alkenyl succinate dissolved in 5 parts of ion-exchanged water was added. Subsequently, the reaction product, aqueous dispersion was coagulated using an aqueous solution of sulfuric acid, and the coagulated product was washed with water and then dried to obtain a graft copolymer (B-8). The proportions used of the composite rubber polymer (A-8), the styrene and the acrylonitrile are shown in Table 4.

(Preparation of Graft Copolymers (B-9) to (B-13))

With the exception of altering the type of composite rubber polymer (A) aqueous dispersion as shown in Table 4, graft copolymers (B-9) to (B-13) were obtained in the same manner as the preparation of the graft copolymer (B-1).

reaction was conducted for 3 hours, and then the temperature was raised to 90° C. and reaction was continued for a further 1 hour. The contents were then removed from the vessel, washed using a centrifugal dewatering device, and then dried, thus obtaining a powdered (meth)acrylate ester resin (C-1). The weight-average molecular weight (Mw) of the (meth)acrylate ester resin (C-1) is shown in Table 5.

(Preparation of (Meth)Acrylate Ester Resin (C-2))

A stainless-steel polymerization vessel fitted with a stirrer was charged with 150 parts of ion exchanged water, 98 parts of methyl methacrylate, 2 parts of N-phenylmaleimide, 0.2 parts of 2,2'-azobis(isobulyronitrile), 0.25 parts of n-octyl mercaptan, and 0.7 parts of polyvinyl alcohol. The internal temperature of the polymerization vessel was raised to 75° C., reaction was conducted for 3 hours, and then the temperature was raised to 90° C. and reaction was continued for a further 1 hour. The contents were then removed from the vessel, washed using a centrifugal dewatering device, and then dried, thus obtaining a powdered (meth)acrylate ester resin (C-2). The weight-average molecular weight (Mw) of the (meth)acrylate ester resin (C-2) is shown in Table 5.

(Preparation of (Meth)Acrylate Ester Resin (C-3))

A stainless-steel polymerization vessel fitted with a stirrer was charged with 150 parts of ion exchanged water, 82 parts of methyl methacrylate, 12 parts of N-phenylmaleimide, 6 parts of styrene, 0.2 parts of 2,2'-azobis(isobutyronitrile), 0.25 parts of n-octyl mercaptan, and 0.7 parts of polyvinyl alcohol. The internal temperature of the polymerization vessel was raised to 75° C., reaction was conducted for 3

TABLE 3

| Graft copolymer (B) | | B-1 | B-2 | B-3 | B-4 | B-5 | B-6 | B-7 |
|---|---|---|---|---|---|---|---|---|
| Composite rubber polymer (A) | A-1 | 50 | | | | | | |
| (solid fraction) | A-2 | | 50 | | | | | |
| (parts) | A-3 | | | 50 | | | | |
| | A-4 | | | | 50 | | | |
| | A-5 | | | | | 50 | | |
| | A-6 | | | | | | 50 | |
| | A-7 | | | | | | | 50 |
| Vinyl-based monomer component | styrene | 37.5 | 37.5 | 37.5 | 37.5 | 37.5 | 37.5 | 37.5 |
| (m1) (parts) | acrylonitrile | 12.5 | 12.5 | 12.5 | 12.5 | 12.5 | 12.5 | 12.5 |
| [total of each monomer] | | | | | | | | |

TABLE 4

| Graft copolymer (B) | | B-8 | B-9 | B-10 | B-11 | B-12 | B-13 |
|---|---|---|---|---|---|---|---|
| Composite rubber polymer (A) | A-8 | 50 | | | | | |
| (solid fraction) | A-9 | | 50 | | | | |
| (parts) | A-10 | | | 50 | | | |
| | A-11 | | | | 50 | | |
| | A-12 | | | | | 50 | |
| | A-13 | | | | | | 50 |
| Vinyl-based monomer component | styrene | 37.5 | 37.5 | 37.5 | 37.5 | 37.5 | 37.5 |
| (m1) (parts) | acrylonitrile | 12.5 | 12.5 | 12.5 | 12.5 | 12.5 | 12.5 |
| [total of each monomer] | | | | | | | |

<(Meth)Acrylate Ester Resin (C)>
(Preparation of (Meth)Acrylate Ester Resin (C-1))

A stainless-steel polymerization vessel fitted with a stirrer was charged with 150 parts of ion exchanged water, 99 parts of methyl methacrylate, 1 part of methyl acrylate, 0.2 parts of 2,2'-azobis(isobutyronitrile), 0.25 parts of n-octyl mercaptan, 0.47 parts of calcium hydroxyapatite, and 0.003 parts of potassium alkenyl succinate. The internal temperature of the polymerization vessel was raised to 75° C., powdered (meth)acrylate ester resin (C-3). The weight-average molecular weight (Mw) of the (meth)acrylate ester resin (C-3) is shown in Table 5.

(Preparation of (Meth)Acrylate Ester Resin (C-4))

A stainless-steel polymerization vessel fitted with a stirrer was charged with 150 parts of ion exchanged water, 56 parts of methyl methacrylate, 29 parts of N-phenylmaleimide, 15 parts of styrene, 0.2 parts of 2,2'-azobis(isobutyronitrile), 0.25 parts of n-octyl mercaptan, and 0.7 parts of polyvinyl alcohol. The internal temperature of the polymerization vessel was raised to 75° C., reaction was conducted for 3 hours, and then the temperature was raised to 90° C. and reaction was continued for a further 1 hour. The contents were then removed from the vessel, washed using a centrifugal dewatering device, and then dried, thus obtaining a powdered (meth)acrylate ester resin (C-4). The weight-average molecular weight (Mw) of the (meth)acrylate ester resin (C-4) is shown in Table 5.

(Preparation of (Meth)Acrylate Ester Resin (C-5))

A stainless-steel polymerization vessel fitted with a stirrer was charged with 150 parts of ion exchanged water, 53 parts of methyl methacrylate, 31 parts of N-phenylmaleimide, 16 parts of styrene, 0.2 parts of 2,2'-azobis(isobutyronitrile), 0.25 parts of n-octyl mercaptan, and 0.7 parts of polyvinyl alcohol. The internal temperature of the polymerization vessel was raised to 75° C., reaction was conducted for 3 hours, and then the temperature was raised to 90° C. and reaction was continued for a further 1 hour. The contents were then removed from the vessel, washed using a centrifugal dewatering device, and then dried, thus obtaining a powdered (meth)acrylate ester resin (C-5). The weight-average molecular weight (Mw) of the (meth)acrylate ester resin (C-5) is shown in Table 5.

(Preparation of (Meth)Acrylate Ester Resin (C-6))

A stainless-steel polymerization vessel fitted with a stirrer was charged with 150 parts of ion exchanged water, 82 parts of methyl methacrylate, 6 parts of N-phenylmaleimide, 6 parts of N-cyclohexylmaleimide, 6 parts of styrene, 0.2 parts of 2,2'-azobis(isobutyronitrile), 0.19 parts of n-octyl mercaptan, and 0.7 parts of polyvinyl alcohol. The internal temperature of the polymerization vessel was raised to 75° C., reaction was conducted for 3 hours, and then the temperature was raised to 90° C. and reaction was continued for a further 1 hour. The contents were then removed from the vessel, washed using a centrifugal dewatering device, and then dried, thus obtaining a powdered (meth)acrylate ester resin (C-6). The weight-average molecular weight (Mw) of the (meth)acrylate ester resin (C-6) is shown in Table 5.

TABLE 5

|  |  | (Meth)acrylate ester resin (C) | | | | | |
|---|---|---|---|---|---|---|---|
|  |  | C-1 | C-2 | C-3 | C-4 | C-5 | C-6 |
| Vinyl-based monomer component (m2) (parts) | methyl methacrylate | 99 | 98 | 82 | 56 | 53 | 82 |
|  | methyl acrylate | 1 |  |  |  |  |  |
|  | N-phenyl-maleimide |  | 2 | 12 | 29 | 31 | 6 |
|  | N-cyclohexyl-maleimide |  |  |  |  |  | 6 |
|  | styrene |  |  | 6 | 15 | 16 | 6 |
| Weight-average molecular weight (×10$^4$) | | 10.5 | 11.0 | 9.0 | 12.1 | 12.0 | 14.0 |

<Silicone Oil (D)>

A product "SH200-100cs" manufactured by Dow Corning Toray Co., Ltd. was used as the silicone oil (D).

<Styrene-Based Resin (E)>

(Preparation of Styrene-Based Resin (E-1))

A stainless-steel polymerization vessel fitted with a stirrer that had been flushed with nitrogen was charged with 120 parts of ion exchanged water, 0.1 parts of polyvinyl alcohol, 0.3 parts of 2,2'-azobis(isobutyronitrile), 25 parts of acrylonitrile, 75 parts of styrene and 0.35 parts of t-dodecyl mercaptan, and the resulting mixture was reacted for 5 hours with the starting temperature set to 60° C. The temperature was then raised to 120° C., and reaction was continued for a further 4 hours. The contents were then removed from the vessel, thus obtaining a styrene-based resin (E-1). The weight-average molecular weight (Mw) of the styrene-based resin (E-1) is shown in Table 6.

(Preparation of Styrene-Based Resin (E-2))

A stainless-steel polymerization vessel fitted with a stirrer was charged with 150 parts of ion exchanged water, 10 parts of methyl methacrylate, 22 parts of acrylonitrile, 68 parts of styrene, 0.2 parts of 2,2'-azobis(isobutyronitrile), 0.25 parts of n-octyl mercaptan, 0.47 parts of calcium hydroxyapatite and 0.003 parts of potassium alkenyl succinate, the internal temperature was raised to 75° C., and a reaction was conducted for 3 hours. The temperature was then raised to 90° C. and held at that temperature for 60 minutes to complete the reaction. The contents were then removed from the vessel, subjected to repeated washing and dewatering using a centrifugal dewatering device, and then dried to obtain a styrene-based resin (E-2). The weight-average molecular weight (Mw) of the styrene-based resin (E-2) is shown in Table 6.

(Preparation of Styrene-Based Resin (E-3))

A stainless-steel polymerization vessel fitted with a stirrer was charged with 150 parts of ion exchanged water, 30 parts of phenylmaleimide, 15 parts of acrylonitrile, 55 parts of styrene, 0.2 parts of 2,2'-azobis(isobutyronitrile), 0.25 parts of n-octyl mercaptan, 0.47 parts of calcium hydroxyapatite and 0.003 parts of potassium alkenyl succinate, the internal temperature was raised to 75° C., and a reaction was conducted for 3 hours. The temperature was then raised to 90° C. and held at that temperature for 60 minutes to complete the reaction. The contents were then removed from the vessel, subjected to repeated washing and dewatering using a centrifugal dewatering device, and then dried to obtain a styrene-based resin (E-3). The weight-average molecular weight (Mw) of the styrene-based resin (E-3) is shown in Table 6.

TABLE 6

| Styrene-based resin (E) | | E-1 | E-2 | E-3 |
|---|---|---|---|---|
| Vinyl-based monomer component (m3) (parts) | styrene | 75 | 68 | 55 |
|  | acrylonitrile | 25 | 22 | 15 |
|  | methyl methacrylate |  | 10 |  |
|  | N-phenylmaleimide |  |  | 30 |
| Weight-average molecular weight (×10$^4$) | | 12.2 | 10.3 | 9.2 |

<Ethylene/α-Olefin Copolymer (F)>

(Preparation of Ethylene/α-Olefin Copolymer (F-1))

A 20 L stainless-steel polymerization vessel fitted with a stirrer was flushed thoroughly with nitrogen, and then charged with 10 L of dehydrated and purified hexane. An 8.0 mmol/L hexane solution of ethyl aluminum sesquichloride $(Al(C_2H_5)_{1.5} \cdot Cl_{1.5})$ was supplied continuously to the vessel for 1 hour at a rate of 5 L/h, and then a 0.8 mmol/L hexane solution of $VOCl_3$ as a catalyst and hexane were each supplied continuously to the vessel at rates of 5 L/h and 5 L/h respectively. Further, the polymerization liquid was also removed continuously from the upper portion of the polymerization vessel so that the amount of the polymerization liquid was maintained at 10 L. Using bubbling tubes, ethylene, propylene and hydrogen were supplied to the vessel at 2,300 L/h, 600 L/h and 400 L/h respectively, and 5-ethylidene-2-norbornene was also supplied simultaneously at a rate of 100 L/h, while the polymerization reaction was conducted at 35° C.

The polymerization reaction was performed under the above conditions, and a polymerization solution containing an ethylene/α-olefin copolymer (F-1) was obtained. The obtained polymerization solution was subjected to decalcification with hydrochloric acid, and was then poured into methanol to precipitate the product, and the resulting precipitate was dried to obtain the ethylene/α-olefin copolymer (F-1). The polymeric properties (weight-average molecular weight and molecular weight distribution) of the ethylene/α-olefin copolymer (F-1) are shown in Table 7.

(Preparation of Ethylene/α-Olefin Copolymers (F-2) to (F-4))

With the exception of altering the amount of hydrogen supplied as shown in Table 7, ethylene/α-olefin copolymers (F-2) to (F-4) were obtained in the same manner as the preparation of ethylene/α-olefin copolymer (F-1). The polymeric properties of the ethylene/α-olefin copolymers (F-2) to (F-4) are shown in Table 7.

TABLE 7

| Ethylene/α-olefin copolymer (F) | | F-1 | F-2 | F-3 | F-4 |
|---|---|---|---|---|---|
| Polymerization conditions | ethylene (L/h) | 2,300 | 2,300 | 2,300 | 2,300 |
| | propylene (L/h) | 600 | 600 | 600 | 600 |
| | 5-ethylidene-2-norbornene (L/h) | 100 | 100 | 100 | 100 |
| | hydrogen (L/h) | 400 | 219 | 99 | 1.5 |
| Polymeric properties | Weight-average molecular weight ($\times 10^4$) | 4.2 | 7.0 | 11.0 | 33.0 |
| | Molecular weight distribution (Mw/Mn) | 3.8 | 3.8 | 3.8 | 3.8 |

<Olefin Resin Aqueous Dispersion (G)>

(Preparation of Olefin Resin Aqueous Dispersion (G-1))

First, 100 parts of the ethylene/α-olefin copolymer (F-1) 20 parts of a maleic anhydride-modified polyethylene (Mitsui Hi-WAX 2203A, manufactured by Mitsui Chemicals, Inc., weight average molecular weight: 2,700, acid value: 30 mg/g) as an acid-modified olefin polymer, and 5 parts of potassium oleate (KS Soap, manufactured by Kao Corporation) as an emulsifier were mixed together.

Next, this mixture was supplied from the hopper of a twin screw extruder (PCM-30, manufactured by Ikegai Inc., L/D=40) at a rate of 4 kg/hour, and was heated to 220° C. and subjected to melt-kneading and extrusion while an aqueous solution prepared by mixing 0.5 parts of potassium hydroxide and 2.4 parts of ion-exchanged water was supplied continuously from the supply port provided at the vent portion of the twin screw extruder. The resulting melt-kneaded product was supplied continuously to a cooling device fitted to the tip of the twin screw extruder, thereby cooling the product to 90° C. The resulting solid that was discharged from the tip of the twin screw extruder was poured into hot water at 80° C. and dispersed in a continuous manner, and the resulting dispersion was adjusted to a solid fraction concentration of about 40% by mass, thus completing preparation of an olefin resin aqueous dispersion (G-1).

The volume average particle size of the ethylene/α-olefin copolymer (F) dispersed in the olefin resin aqueous dispersion (G-1) is shown in Table 8.

(Preparation of Olefin Resin Aqueous Dispersions (G-2) to (G-4))

As illustrated in Table 8, with the exception of altering the ethylene/α-olefin copolymer (F) from the ethylene/α-olefin copolymer (F-1) to the ethylene/α-olefin copolymers (F-2) to (A-4), olefin resin aqueous dispersions (G-2) to (G-4) were prepared in the same manner as the preparation of the olefin resin aqueous dispersion (G-1).

The volume average particle sizes of the ethylene/α-olefin copolymer (F) dispersed in the olefin resin aqueous dispersions (G-2) to (G-4) are shown in Table 8.

TABLE 8

| Olefin resin aqueous dispersion (G) | | G-1 | G-2 | G-3 | G-4 |
|---|---|---|---|---|---|
| Ethylene/α-olefin copolymer (F) (parts) | F-1 | 100 | | | |
| | F-2 | | 100 | | |
| | F-3 | | | 100 | |
| | F-4 | | | | 100 |
| Volume average particle size (μm) | | 0.40 | 0.42 | 0.41 | 0.40 |

<Crosslinked Ethylene/α-Olefin Copolymer (H)>

(Preparation of Crosslinked Ethylene/α-Olefin Copolymer (H-1))

Ion-exchanged water was added to the olefin resin aqueous dispersion (G-1) (in an amount equivalent to a solid fraction of 100 parts) so as to adjust the solid fraction concentration to 35%, 1.2 parts of t-butyl cumyl peroxide as an organic peroxide and 1 part of divinylbenzene as a polyfunctional compound were then added, and the resulting mixture was reacted at 130° C. for 5 hours, thus preparing a crosslinked ethylene/α-olefin copolymer (H-1). The gel content ratio and the volume average particle size of the crosslinked ethylene/α-olefin copolymer (H-1) are shown in Table 9.

(Preparation of Crosslinked Ethylene/α-Olefin Copolymers (H-2) to (H-4))

With the exceptions of altering the type of olefin resin aqueous dispersion (G) and the amount added of the t-butyl cumyl peroxide as shown in Table 9, crosslinked ethylene/α-olefin copolymers (H-2) to (H-4) were prepared in the same manner as the preparation of the crosslinked ethylene/α-olefin copolymer (H-1). The gel content ratios and volume average particle sizes of the crosslinked ethylene/α-olefin copolymers (H-2) to (H-4) are shown in Table 9.

(Preparation of Crosslinked Ethylene/α-Olefin Copolymer (H-5))

First, 1.0 parts of α,α'-bis(t-butylperoxy)diisopropylbenzene as an organic peroxide and 1.0 parts of divinylbenzene were mixed with 100 parts of the ethylene/α-olefin copolymer (F-2), the resulting mixture was subjected to melt-kneading using a twin-screw extruder (PCM-30, manufactured by Ikegai Inc.) fitted with a vacuum vent of 30 mmø, under conditions including a temperature of 220° C. and a vacuum of 93.325 kPa, and the resulting product was then ground finely to obtain a crosslinked ethylene/α-olefin copolymer (H-5). The gel content ratio and volume average particle size of the crosslinked ethylene/α-olefin copolymer (II-5) are shown in Table 9.

TABLE 9

| Crosslinked ethylene/α-olefin copolymer (H) | | H-1 | H-2 | H-3 | H-4 | H-5 |
|---|---|---|---|---|---|---|
| Olefin resin aqueous dispersion (G) | G-1 | 100 | | | | |
| (solid fraction) (parts) | G-2 | | 100 | | | |
| | G-3 | | | 100 | | |
| | G-4 | | | | 100 | |
| Ethylene/α-olefin copolymer (F) | F-2 | | | | | 100 |
| t-butyl cumyl peroxide (parts) | | 1.2 | 1.0 | 0.9 | 0.5 | |
| α,α'-bis(t-butylperoxy)diisopropylbenzene (parts) | | | | | | 1 |
| Divinylbenzene (parts) | | 1 | 1 | 1 | 1 | 1 |
| Gel content ratio (%) | | 70 | 70 | 70 | 70 | 70 |
| Volume average particle size (μm) | | 0.40 | 0.42 | 0.41 | 0.40 | 0.40 |

<Graft Copolymer (I)>
(Preparation of Graft Copolymer (I-I))

A stainless-steel polymerization vessel fitted with a stirrer was charged with the ethylene/α-olefin copolymer (F-1) (in an amount equivalent to a solid fraction of 70 parts of the ethylene/α-olefin copolymer (F-1)), ion-exchanged water was added to adjust the solid fraction concentration of the crosslinked ethylene/α-olefin copolymer (H-1) to 30%, 0.006 parts of ferrous sulfate, 0.3 parts of sodium pyrophosphate and 0.35 parts of fructose were then added, and the temperature was adjusted to 80° C. Subsequently, 19.8 parts of styrene, 10.2 parts of acrylonitrile and 0.6 parts of cumene hydroperoxide were added continuously over a period of 150 minutes, and an emulsion polymerization was conducted while the polymerization temperature was maintained at 80° C., thus obtaining an aqueous dispersion containing a graft copolymer (I-1) with a volume average particle size of 0.41 μm.

An antioxidant was added to the aqueous dispersion containing the graft copolymer (I-1), the solid fraction was precipitated by adding sulfuric acid, and the resulting precipitate was washed, dewatered and dried, thus obtaining the powdered graft copolymer (I-1) Measurement of the graft ratio of the graft copolymer (I-1) yielded a result of 30%. A thermoplastic resin composition prepared by melt-kneading the graft copolymer (I-1) and the styrene-based resin (E-1) in proportions of 20% by mass and 80% by mass respectively was subjected to ruthenium staining, and the volume average particle size of the ethylene/α-olefin copolymer (F) within the thermoplastic resin composition was confirmed by preparing an ultra-thin test piece and inspecting the test piece under an electron microscope, revealing a volume average particle size of 0.41 μm.

(Preparation of Graft Copolymers (I-2) to (I-4))

With the exception of altering the type of crosslinked ethylene/α-olefin copolymer (H) as shown in Table 10, graft copolymers (I-2) to (I-4) were obtained in the same manner as the preparation of the graft copolymer (I-1). The graft ratios of the graft copolymers (I-2) to (I-4) are shown in Table 10.

(Preparation of Graft Copolymer (I-5))

A stainless-steel polymerization vessel fitted with a stirrer was charged with 70 prats of the crosslinked ethylene/α-olefin copolymer (H-5) and 300 parts of toluene, and the contents were stirred at 70° C. for 1 hour, yielding a uniform solution. Following thorough flushing of the vessel with nitrogen, 19.8 parts of styrene, 10.2 parts of acrylonitrile, 0.24 parts of t-dodecyl mercaptan and 0.22 parts of t-butylperoxy isopropyl monocarbonate were added, the internal temperature was raised to 110° C., and a reaction was conducted for 4 hours. The internal temperature was then raised to 120° C. and reaction was continued for a further 2 hours. Following polymerization, the internal temperature was cooled to 100° C., and 0.2 parts of octadecyl-3-(3,5-di-t-butyl-4-hydroxyphenol)-propionate was added. The reaction mixture was extracted from the vessel, and any unreacted material and the solvent were removed by steam distillation. Then, using a twin-screw extruder (PCM-30, manufactured by Ikegai Inc.) fitted with a vacuum vent of 30 mmø, volatile components were substantially volatilized under conditions including a temperature of 220° C. and a vacuum of 93.325 kPa, and pelletization was then performed, thus obtaining a graft copolymer (I-5). Measurement of the graft ratio of the graft copolymer (I-5) yielded a result of 30%. A thermoplastic resin composition prepared by melt-kneading the graft copolymer (I-5) and the styrene-based resin (E-1) in proportions of 20% by mass and 80% by mass respectively was subjected to ruthenium staining, and the volume average particle size of the ethylene/α-olefin copolymer (F) within the thermoplastic resin composition was confirmed by preparing an ultra-thin test piece and inspecting the test piece under an electron microscope, revealing a volume average particle size of 0.40 μm.

(Preparation of Graft Copolymer (I-6))

With the exception of replacing the crosslinked ethylene/α-olefin copolymer (H-1) with the olefin resin aqueous dispersion (G-2) as shown in Table 10, a graft copolymer (I-6) was prepared using the same preparation as the graft copolymer (I-1). The graft ratio of the graft copolymer (I-6) is shown in Table 10.

TABLE 10

| Graft copolymer (I) | | | I-1 | I-2 | I-3 | I-4 | I-5 | I-6 |
|---|---|---|---|---|---|---|---|---|
| Crosslinked ethylene/α-olefin | | H-1 | 70 | | | | | |
| copolymer (H) | | H-2 | | 70 | | | | |
| (solid fraction) (parts) | | H-3 | | | 70 | | | |
| | | H-4 | | | | 70 | | |
| | | H-5 | | | | | 70 | |
| Olefin resin aqueous dispersion (G) | | G-2 | | | | | | 70 |
| Vinyl-based monomer | | styrene | 19.8 | 19.8 | 19.8 | 19.8 | 19.8 | 19.8 |
| component (m4) (parts) | | acrylonitrile | 10.2 | 10.2 | 10.2 | 10.2 | 10.2 | 10.2 |
| Graft ratio (%) | | | 30 | 30 | 30 | 30 | 30 | 30 |

Example 1

First, 40 parts of the graft copolymer (B-2), 60 parts of the (meth)acrylate ester resin (C-3) and 0.3 parts of the silicone oil (D-1) were mixed, and the resulting mixture was melt-kneaded using a twin-screw extruder (PCM30, manufactured by Ikegai Inc.) fitted with a vacuum vent of 30 mmø, under conditions including a temperature of 240° C. and a vacuum of 93.325 kPa, thus obtaining a thermoplastic resin composition. The MVR of the thermoplastic resin composition is shown in Table 11.

The thus obtained thermoplastic resin composition was pelletized, each of the various types of molded articles were molded, and the impact resistance, heat resistance, coloration, weather resistance, heat aging resistance, scratching resistance, abrasion resistance and abrasion resistance persistence were evaluated. The results are shown in Tables 11.

Examples 2 to 36

With the exception of altering the blend formulation as shown in Tables 11 to 14, thermoplastic resin compositions were prepared in the same manner as Example 1, and the MVR was measured for each composition.

Each of the thermoplastic resin compositions was pelletized, the various types of molded articles were molded, and the impact resistance, heat resistance, coloration, weather resistance, heat aging resistance, scratching resistance, abrasion resistance and abrasion resistance persistence were evaluated.

The results are shown in Tables 11 to 14.

Comparative Examples 1 to 9

With the exception of altering the blend formulation as shown in Table 15, thermoplastic resin compositions were prepared in the same manner as Example 1, and the MVR was measured for each composition.

Each of the thermoplastic resin compositions was pelletized, the various types of molded articles were molded, and the impact resistance, heat resistance, coloration, weather resistance, heat aging resistance, scratching resistance, abrasion resistance and abrasion resistance persistence were evaluated.

The results are shown in Table 15.

TABLE 11

| | | | Example | | | | | | | | | |
|---|---|---|---|---|---|---|---|---|---|---|---|---|
| | | | 1 | 2 | 3 | 4 | 5 | 6 | 7 | 8 | 9 |
| Blend formulation (parts) | Graft copolymer (B) | B-2 | 40 | | | | | | | | |
| | | B-3 | | 40 | | | | | | | |
| | | B-4 | | | 40 | | | | | | |
| | | B-5 | | | | 40 | | | | | |
| | | B-6 | | | | | 40 | | | | |
| | | B-9 | | | | | | 40 | | | |
| | | B-10 | | | | | | | 40 | | |
| | | B-11 | | | | | | | | 40 | |
| | | B-12 | | | | | | | | | 40 |
| | (Meth)acrylate ester resin (C) | C-3 | 60 | 60 | 60 | 60 | 60 | 60 | 60 | 60 | 60 |
| | Silicone oil (D) | D-1 | 0.3 | 0.3 | 0.3 | 0.3 | 0.3 | 0.3 | 0.3 | 0.3 | 0.3 |
| Evaluation of physical properties | 230° C. MVR | cm³/10 min | 4 | 4 | 4 | 4 | 4 | 4 | 4 | 4 | 4 |
| | Charpy impact strength | kJ/m² | 8 | 10 | 13 | 14 | 15 | 8 | 10 | 11 | 8 |
| | Heat resistance | ° C. | 92 | 92 | 92 | 92 | 92 | 92 | 92 | 92 | 92 |
| | Coloration | L* | 4.0 | 4.0 | 4.0 | 4.1 | 4.5 | 4.0 | 4.0 | 4.0 | 4.0 |
| | Weather resistance | ΔE | 1.1 | 1.2 | 1.3 | 1.4 | 1.9 | 1.3 | 1.3 | 1.3 | 1.3 |
| | Heat aging resistance | ΔE | 1.0 | 1.0 | 1.0 | 1.3 | 1.7 | 1.0 | 1.0 | 1.0 | 1.0 |
| | Scratching resistance | ΔL*(mb − ma) | 2.0 | 2.0 | 2.0 | 2.0 | 2.0 | 2.0 | 2.0 | 2.0 | 2.0 |
| | Abrasion resistance -1 | ΔL*(mc − ma) | 0.1 | 0.1 | 0.1 | 0.3 | 0.9 | 0.9 | 0.5 | 0.1 | 0.1 |
| | Abrasion resistance -2 | ΔL*(me − md) | 1.7 | 1.7 | 1.7 | 1.9 | 2.5 | 2.7 | 2.3 | 1.7 | 1.7 |
| | Abrasion resistance persistence | Δ(ΔL*) | 1.6 | 1.6 | 1.6 | 1.6 | 1.6 | 1.8 | 1.8 | 1.6 | 1.6 |

TABLE 12

| | | | Example | | | | | | | | |
|---|---|---|---|---|---|---|---|---|---|---|---|
| | | | 10 | 11 | 12 | 13 | 14 | 15 | 16 | 17 | 18 |
| Blend formulation (parts) | Graft copolymer (B) | B-4 | 40 | 40 | 19 | 21 | 49 | 51 | 40 | 40 | 40 |
| | (Meth)acrylate ester resin (C) | C-1 | | | | | | | 35 | | |
| | | C-2 | 60 | | | | | | | | |
| | | C-3 | | | 81 | 79 | 51 | 49 | 25 | 56 | 56 |
| | | C-4 | | 60 | | | | | | | |
| | | C-6 | | | | | | | | | |
| | Styrene-based resin (E) | E-1 | | | | | | | | 4 | |
| | | E-2 | | | | | | | | | 4 |
| | | E-3 | | | | | | | | | |
| | Silicone oil (D) | D-1 | 0.3 | 0.3 | 0.3 | 0.3 | 0.3 | 0.3 | 0.3 | 0.3 | 0.3 |
| Evaluation of physical properties | 230° C. MVR | cm³/10 min | 8 | 4 | 4 | 4 | 4 | 4 | 8 | 5 | 5 |
| | Charpy impact strength | kJ/m² | 13 | 13 | 8 | 11 | 15 | 16 | 13 | 14 | 14 |
| | Heat resistance | ° C. | 85 | 113 | 94 | 93 | 90 | 89 | 85 | 91 | 91 |
| | Coloration | L* | 3.8 | 5.0 | 4.0 | 4.0 | 4.0 | 4.0 | 3.5 | 4.0 | 4.0 |
| | Weather resistance | ΔE | 1.2 | 1.7 | 1.3 | 1.3 | 1.3 | 1.3 | 1.3 | 1.4 | 1.4 |
| | Heat aging resistance | ΔE | 1.9 | 1.0 | 1.0 | 1.0 | 1.0 | 1.0 | 1.2 | 1.1 | 1.1 |
| | Scratching resistance | ΔL*(mb − ma) | 2.0 | 2.0 | 2.0 | 2.0 | 2.1 | 2.3 | 2.0 | 2.0 | 2.0 |
| | Abrasion resistance -1 | ΔL*(mc − ma) | 0.1 | 0.1 | 1.2 | 0.4 | 0.1 | 0.1 | 0.1 | 0.1 | 0.1 |

TABLE 12-continued

|  |  |  | Example |  |  |  |  |  |  |  |  |
|---|---|---|---|---|---|---|---|---|---|---|---|
|  |  |  | 10 | 11 | 12 | 13 | 14 | 15 | 16 | 17 | 18 |
|  | Abrasion resistance -2 | ΔL*(me − md) | 1.7 | 1.7 | 3.0 | 2.2 | 1.5 | 1.5 | 1.7 | 1.7 | 1.7 |
|  | Abrasion resistance persistence | Δ(ΔL*) | 1.6 | 1.6 | 1.8 | 1.8 | 1.4 | 1.4 | 1.6 | 1.6 | 1.6 |

TABLE 13

|  |  |  | Example |  |  |  |  |  |  |  |  |
|---|---|---|---|---|---|---|---|---|---|---|---|
|  |  |  | 19 | 20 | 21 | 22 | 23 | 24 | 25 | 26 | 27 |
| Blend formulation (parts) | Graft copolymer (B) | B-4 | 40 | 40 | 40 | 40 | 40 | 40 | 40 | 40 | 40 |
|  | (Meth)acrylate ester resin (C) | C-1 |  |  |  |  |  |  |  | 35 |  |
|  |  | C-2 |  |  |  |  |  |  |  |  |  |
|  |  | C-3 | 40 | 60 | 60 | 60 | 60 | 60 |  |  |  |
|  |  | C-4 |  |  |  |  |  |  |  |  |  |
|  |  | C-6 |  |  |  |  |  |  | 60 | 25 | 60 |
|  | Styrene-based resin (E) | E-1 |  |  |  |  |  |  |  |  |  |
|  |  | E-2 |  |  |  |  |  |  |  |  |  |
|  |  | E-3 | 20 |  |  |  |  |  |  |  |  |
|  | Silicone oil (D) | D-1 | 0.3 | 0 | 0.2 | 0.4 | 2.9 | 3.1 | 0 | 0.3 | 0.3 |
| Evaluation of physical properties | 230° C. MVR | cm³/10 min | 4 | 4 | 4 | 4 | 4 | 4 | 4 | 8 | 4 |
|  | Charpy impact strength | kJ/m² | 10 | 10 | 12 | 13 | 13 | 13 | 11 | 14 | 14 |
|  | Heat resistance | ° C. | 99 | 92 | 92 | 92 | 92 | 92 | 97 | 90 | 97 |
|  | Coloration | L* | 5.0 | 4.0 | 4.0 | 4.0 | 4.0 | 4.5 | 3.5 | 3.2 | 3.5 |
|  | Weather resistance | ΔE | 1.7 | 1.3 | 1.3 | 1.3 | 1.3 | 1.3 | 1.3 | 1.1 | 1.1 |
|  | Heat aging resistance | ΔE | 1.2 | 0.8 | 0.9 | 1.0 | 1.0 | 1.3 | 0.6 | 1.0 | 0.7 |
|  | Scratching resistance | ΔL*(mb − ma) | 2.0 | 2.3 | 2.1 | 2.0 | 2.0 | 2.0 | 2.3 | 2.0 | 2.0 |
|  | Abrasion resistance -1 | ΔL*(mc − ma) | 0.1 | 0.8 | 0.3 | 0.1 | 0.1 | 0.1 | 0.8 | 0.1 | 0.1 |
|  | Abrasion resistance -2 | ΔL*(me − md) | 1.7 | 2.0 | 1.7 | 1.7 | 1.7 | 1.7 | 2.0 | 1.7 | 1.7 |
|  | Abrasion resistance persistence | Δ(ΔL*) | 1.6 | 1.2 | 1.4 | 1.6 | 1.6 | 1.6 | 1.2 | 1.6 | 1.6 |

TABLE 14

|  |  |  | Example |  |  |  |  |  |  |  |  |
|---|---|---|---|---|---|---|---|---|---|---|---|
|  |  |  | 28 | 29 | 30 | 31 | 32 | 33 | 34 | 35 | 36 |
| Blend formulation (parts) | Graft copolymer (B) | B-4 | 32.5 | 32.5 | 32.5 | 32.5 | 32.5 | 32.5 | 32.5 | 32.5 | 32.5 |
|  | (Meth)acrylate ester resin (C) | C-1 |  |  |  |  |  |  | 20 | 20 |  |
|  |  | C-3 | 65 | 65 | 65 | 65 | 65 | 65 |  |  |  |
|  |  | C-6 |  |  |  |  |  |  | 45 | 45 | 65 |
|  | Graft copolymer (I) | I-1 | 2.5 |  |  |  |  |  |  |  |  |
|  |  | I-2 |  | 2.5 |  |  |  |  | 2.5 | 2.5 | 2.5 |
|  |  | I-3 |  |  | 2.5 |  |  |  |  |  |  |
|  |  | I-4 |  |  |  | 2.5 |  |  |  |  |  |
|  |  | I-5 |  |  |  |  | 2.5 |  |  |  |  |
|  |  | I-6 |  |  |  |  |  | 2.5 |  |  |  |
|  | Silicone oil (D) | D-1 | 0.3 | 0.3 | 0.3 | 0.3 | 0.3 | 0.3 | 0 | 0.3 | 0.3 |
| Evaluation of physical properties | 230° C. MVR | cm³/10 min | 4 | 4 | 3.5 | 2 | 4 | 4 | 12 | 12 | 4 |
|  | Charpy impact strength | kJ/m² | 14 | 19 | 19 | 11 | 11 | 11 | 17 | 20 | 19 |
|  | Heat resistance | ° C. | 95 | 95 | 95 | 95 | 95 | 95 | 95 | 95 | 99 |
|  | Coloration | L* | 5.0 | 4.5 | 4.5 | 4.5 | 4.7 | 5.2 | 3.5 | 3.7 | 4.0 |
|  | Weather resistance | ΔE | 1.5 | 1.5 | 1.5 | 1.5 | 1.5 | 1.5 | 1.1 | 1.3 | 1.3 |
|  | Heat aging resistance | ΔE | 1.5 | 1.4 | 1.5 | 1.5 | 1.5 | 1.5 | 1.2 | 1.4 | 1.2 |
|  | Scratching resistance | ΔL*(mb − ma) | 1.4 | 1.4 | 1.4 | 1.4 | 1.4 | 1.4 | 1.4 | 1.4 | 1.4 |
|  | Abrasion resistance -1 | ΔL*(mc − ma) | 1.2 | 0.8 | 0.8 | 0.8 | 0.8 | 1.5 | 0.8 | 0.8 | 0.8 |
|  | Abrasion resistance -2 | ΔL*(me − md) | 1.2 | 0.8 | 0.8 | 0.8 | 0.8 | 1.5 | 0.8 | 0.8 | 0.8 |
|  | Abrasion resistance persistence | Δ(ΔL*) | 0.0 | 0.0 | 0.0 | 0.0 | 0.0 | 0.0 | 0.0 | 0.0 | 0.0 |

TABLE 15

|  |  |  | Comparative Example |  |  |  |  |  |  |  |  |
|---|---|---|---|---|---|---|---|---|---|---|---|
|  |  |  | 1 | 2 | 3 | 4 | 5 | 6 | 7 | 8 | 9 |
| Blend formulation (parts) | Graft copolymer (B) | B-1 | 40 |  |  |  |  |  |  |  |  |
|  |  | B-4 |  |  |  |  | 40 | 40 | 40 |  | 40 |
|  |  | B-7 |  | 40 |  |  |  |  |  |  |  |
|  |  | B-8 |  |  | 40 |  |  |  |  |  |  |
|  |  | B-13 |  |  |  | 40 |  |  |  |  |  |

TABLE 15-continued

| | | | Comparative Example | | | | | | | | |
|---|---|---|---|---|---|---|---|---|---|---|---|
| | | | 1 | 2 | 3 | 4 | 5 | 6 | 7 | 8 | 9 |
| | (Meth)acrylate ester resin (C) | C-1 | | | | | 60 | | | | 20 |
| | | C-3 | 60 | 60 | 60 | 60 | | | | | |
| | | C-5 | | | | | | 60 | | | |
| | Styrene-based resin (E) | E-3 | | | | | | | 60 | 60 | 40 |
| | Graft copolymer (I) | I-2 | | | | | | | | 40 | |
| | Silicone oil (D) | D-1 | | | | | | | 0.3 | 0.3 | 0.3 |
| Evaluation of physical properties | 230° C. MVR | cm³/10 min | 4 | 4 | 4 | 4 | 8 | 4 | 4 | 4 | 9 |
| | Charpy impact strength | kJ/m² | 3 | 15 | 3 | 3 | 13 | 13 | 10 | 12 | 10 |
| | Heat resistance | ° C. | 92 | 92 | 92 | 92 | 75 | 113 | 111 | 110 | 88 |
| | Coloration | L* | 4.0 | 6.1 | 4.0 | 4.0 | 3.8 | 6.5 | 6.5 | 7.5 | 6.0 |
| | Weather resistance | ΔE | 1.1 | 3.2 | 1.3 | 1.3 | 1.0 | 3.2 | 2.9 | 3.4 | 2.4 |
| | Heat aging resistance | ΔE | 1.0 | 3.0 | 1.0 | 1.0 | 3.2 | 1.0 | 1.3 | 3.5 | 1.1 |
| | Scratching resistance | ΔL*(mb − ma) | 2.0 | 2.0 | 2.0 | 2.0 | 2.0 | 2.0 | 2.7 | 2.5 | 2.2 |
| | Abrasion resistance -1 | ΔL*(mc − ma) | 0.1 | 3.2 | 3.5 | 0.1 | 0.1 | 0.1 | 0.5 | 2.2 | 0.3 |
| | Abrasion resistance -2 | ΔL*(me − md) | 1.7 | 4.8 | 4.7 | 1.5 | 1.7 | 1.7 | 2.1 | 2.2 | 1.9 |
| | Abrasion resistance persistence | Δ(ΔL*) | 1.6 | 1.6 | 1.2 | 1.4 | 1.6 | 1.6 | 1.6 | 0.0 | 1.6 |

The thermoplastic resin compositions of Examples 1 to 36 exhibited excellent fluidity. Further, the molded articles of Examples 1 to 36 exhibited excellent impact resistance, heat resistance, coloration, weather resistance, heat aging resistance, scratching resistance, abrasion resistance and abrasion resistance persistence. Examples 28 to 36 exhibited particular superior abrasion resistance persistence.

In contrast, the molded articles of comparative examples 1 to 9 exhibited unsatisfactory results for at least one property among the impact resistance, heat resistance, coloration, weather resistance, heat aging resistance, abrasion resistance and abrasion resistance persistence.

Accordingly, it was confirmed that the thermoplastic resin composition of the present invention exhibited excellent fluidity, and that by using the thermoplastic resin composition of the present invention, a molded article having excellent scratch resistance, impact resistance, coloration, heat resistance, weather resistance and heat aging resistance could be obtained.

INDUSTRIAL APPLICABILITY

Molded articles formed using the thermoplastic resin composition of the present invention are useful as interior and exterior componentry for vehicles, office equipment, household electronics, and building materials and the like.

DESCRIPTION OF THE REFERENCE SIGNS

10: Jig
11: Tip portion
12: Laminated sheet
13: Molded article

The invention claimed is:

1. A thermoplastic resin composition comprising:
   a graft copolymer (B) obtained by polymerizing a vinyl-containing monomer component (m1) comprising an aromatic vinyl compound and a vinyl cyanide compound in presence of a composite rubber polymer (A) comprising
      a polyorganosiloxane (Aa) and a poly(meth)acrylate ester (Ab) having units derived from a (meth)acrylate ester and either one of, or both, units derived from a crosslinking agent and units derived from a graft-linking agent;
   a (meth)acrylate ester resin (C) obtained by polymerizing a vinyl-containing monomer component (m2) comprising a (meth)acrylate ester, a maleimide-containing compound and an aromatic vinyl compound, and
   a graft copolymer (I) obtained by polymerizing a vinyl-containing monomer component (m4) comprising an aromatic vinyl compound and a vinyl cyanide compound in presence of an olefin-containing copolymer,
   wherein
   an amount of the polyorganosiloxane (Aa) relative to a total mass (100% by mass) of the composite rubber polymer (A) is from 1 to 20% by mass,
   a volume average particle size of the composite rubber polymer (A) is from 0.05 to 0.15 μm,
   relative to a total mass (100% by mass) of the vinyl-containing monomer component (m1), an amount of the aromatic vinyl compound is from 65 to 82% by mass, and an amount of the vinyl cyanide compound is from 18 to 35% by mass,
   the graft copolymer (B) is obtained by polymerizing 10 to 80% by mass of the vinyl-containing monomer component (m1) in presence of 20 to 90% by mass of the composite rubber polymer (A), wherein a combination of the composite rubber polymer (A) and the vinyl-containing monomer component (m1) totals 100% by mass,
   relative to a total mass (100% by mass) of the vinyl-containing monomer component (m2), an amount of the maleimide-containing compound is from 1 to 30% by mass, and an amount of the aromatic vinyl compound is from 5.5 to 15% by mass,
   relative to a total mass (100% by mass) of the vinyl-containing monomer component (m4), an amount of the aromatic vinyl compound is from 60 to 85% by mass, and an amount of the vinyl cyanide compound is from 15 to 40% by mass,
   the graft copolymer (I) is obtained by polymerizing 20 to 50% by mass of the vinyl-based monomer component (m4) in the presence of the olefin-based copolymer, wherein a combination of the olefin-based copolymer and the vinyl-containing monomer component (m4) totals 100% by mass, and
   relative to a total mass of the graft copolymer (B), the (meth)acrylate ester resin (C) and the graft copolymer (I), an amount of the graft copolymer (B) is from 18 to 60% by mass, an amount of the (meth)acrylate ester resin (C) is from 30 to 81% by mass, and an amount of the graft copolymer (I) is from 1 to 10% by mass.

2. The thermoplastic resin composition according to claim 1, wherein the polyorganosiloxane (Aa) is a polyorganosiloxane having a vinyl polymerizable functional group.

3. The thermoplastic resin composition according to claim 1, wherein the polyorganosiloxane (Aa) comprises 0.3 to 3 mol % of siloxane units comprising a vinyl polymerizable functional group and 97 to 99.7 mol % of dimethylsiloxane units relative to a total number of moles of all structural units, and a number of silicon atoms having 3 or more siloxane linkages is not more than 1 mol % relative to a total number of moles of all silicon atoms.

4. The thermoplastic resin composition according to claim 1, wherein relative to a total mass of the graft copolymer (B) and the (meth)acrylate ester resin (C), an amount of the graft copolymer (B) is from 18 to 80% by mass, and an amount of the (meth)acrylate ester resin (C) is from 20 to 82% by mass.

5. The thermoplastic resin composition according to claim 1, further comprising a silicone oil (D).

6. The thermoplastic resin composition according to claim 5, wherein an amount of the silicone oil (D) is from 0.1 to 5 parts by mass per 100 parts by mass of a combination of the graft copolymer (B) and the (meth)acrylate ester resin (C).

7. The thermoplastic resin composition according to claim 1, further comprising a styrene-containing resin (E) obtained by polymerizing a vinyl-containing monomer component (m3) comprising an aromatic vinyl compound and a vinyl cyanide compound.

8. The thermoplastic resin composition according to claim 7, wherein relative to a total mass of the graft copolymer (B), the (meth)acrylate ester resin (C) and the styrene-containing resin (E), an amount of the graft copolymer (B) is from 18 to 60% by mass, an amount of the (meth)acrylate ester resin (C) is from 20 to 81% by mass, and an amount of the styrene-containing resin (E) is from 1 to 40% by mass.

9. The thermoplastic resin composition according to claim 1, wherein a Charpy impact strength of a molded article (Ma1) formed from the thermoplastic resin composition is at least 5 kJ/m$^2$.

10. The thermoplastic resin composition according to claim 1, wherein an absolute value of a difference in lightness ΔL*(mc−ma) of a molded article (Ma2) formed from the thermoplastic resin composition before and after an abrasion resistance test is less than 3.0.

11. A molded article, comprising the thermoplastic resin composition according to claim 1.

* * * * *